United States Patent [19]
Suzuki et al.

[11] Patent Number: 5,999,282
[45] Date of Patent: Dec. 7, 1999

[54] COLOR FILTER AND COLOR IMAGE DISPLAY APPARATUS EMPLOYING THE FILTER

[75] Inventors: Tetsuji Suzuki, Yokosuka; Shintaro Nakagaki, Miura, both of Japan

[73] Assignee: Victor Company of Japan, Ltd., Yokohama, Japan

[21] Appl. No.: 08/744,917

[22] Filed: Nov. 7, 1996

[30] Foreign Application Priority Data

Nov. 8, 1995 [JP] Japan .................................. 7-315956

[51] Int. Cl.$^6$ .......................... G02B 5/32; G02F 1/1335
[52] U.S. Cl. ................................ 359/20; 359/15; 349/5; 349/9; 349/95; 349/96
[58] Field of Search .................. 359/20, 19, 16, 359/15, 565, 569; 349/5, 6, 7, 9, 61, 62, 63, 95, 96

[56] References Cited

U.S. PATENT DOCUMENTS

| | | |
|---|---|---|
| 4,807,978 | 2/1989 | Grinberg et al. . |
| 5,506,701 | 4/1996 | Ichikawa . |
| 5,727,040 | 3/1998 | Ichikawa et al. ................ 359/15 |

FOREIGN PATENT DOCUMENTS

| | | |
|---|---|---|
| 0579382 | 1/1994 | European Pat. Off. . |
| 06308332 | 4/1994 | Japan . |
| 8-240717 | 9/1996 | Japan . |
| 8-240868 | 9/1996 | Japan . |
| WO 92/09915 | 6/1992 | WIPO . |

*Primary Examiner*—Jon Henry
*Attorney, Agent, or Firm*—Michael N. Meller; Eugene Lieberstein

[57] ABSTRACT

An improved color filter and a color image display apparatus employs the filter, the color filter has a hologram device for spectrally diffracting an incident light into plural light beams of different wavelength regions and selectively converging the plural light beams on respective plural picture element electrodes corresponding to the different wavelength regions. The hologram device has such characteristics that S-polarized components of the incident light are diffracted at a maximum diffraction efficiency at a predetermined incident angle of the incident light, and P-polarized components of the incident light are diffracted as such that a difference between the maximum diffraction efficiency of the S-polarized components and the diffraction efficiency of the P-polarized components is not less than 30%, and the diffracted S-polarized components are formed as the plural light beams to be converged on the plural picture element electrodes corresponding to the different wavelength regions.

18 Claims, 17 Drawing Sheets

COLOR FILTER AND COLOR IMAGE DISPLAY APPARATUS EMPLOYING THE FILTER

BACKGROUND OF THE INVENTION

1. Field of the Invention

This invention relates to color filters used in image displays and image sensing systems, other image processing systems and color image display apparatuses, and in particular relates to improvements on an availability of light in reflecting type color image display apparatuses.

2. Description of the Related Arts

Recently, there arise many demands on projection type display apparatuses for such as an outdoor public use and a commercial use and for displaying a high definition image on a screen as a largely magnified image.

Generally, the projection type display apparatuses are largely categorized into two types, a transmission type and a reflection type, however, the both types employ a spatial light modulation section having an LCD (Liquid Crystal Display) panel, wherein an incident light beam is allowed to impinge on the LCD panel and an output light beam therefrom is obtained therefrom as a projected light by modulating the incident light by the spatial light modulation section corresponding to picture signals.

Here, the LCD panel is composed of an active matrix substrate.

On the active matrix substrate, there are provided switching elements such as thin film transistors, a picture element electrode layer having a plurality of picture element electrodes, a common electrode layer and a liquid crystal layer interposed between the picture element electrode layer and the common electrode layer. An alignment of moleculars of the liquid crystal layer is controlled by controlling electric potential between the common and picture element electrode layers by the switching elements corresponding to the applied picture signal.

Thus, a read light is modulated responsive to a change of the molecular alignment of the liquid crystal caused by the electric potential distribution between the picture element electrodes and the common electrode layer corresponding to the picture signal applied across the 2 layer of electrodes.

One of the differences between the transmission type and reflection type is that in the former the projection light passes through the transparent substrate of the active matrix, on the other hand, in the latter the projection light is reflected by the picture element electrodes or a dielectric mirror layer provided thereon.

Generally, in the reflection type projection apparatus, there is no need to provide black stripes. This allows to each crystal cell to have a larger aperture ratio. Further, there is few heat generation caused by an absorption of the read light. This allows a larger light output to irradiate the LCD panel for a given power. Thus, a brighter image can be obtained in the reflection type compared with that of the transmission type.

In conventional transmission type projection color image display apparatus, a color image is obtained by using three sheets of transmission type LCD panels corresponding to the three primary colors (R (red), G (green), B (blue)) and a three color composite optical system for composing a color composite light from the three color lights passing through the transmission type LCD, resulting in a large sized apparatus and a high production cost.

As a countermeasure, there is proposed an apparatus employing a single plate type color filter, wherein color filters are disposed as a single layer pattern of stripe, mosaic or a delta state opposing to the transparent picture element electrodes to be driven corresponding to color pattern of the filters. Here, filter elements of the three colors are closely grouped and disposed orderly.

The lights outputted from the filter elements of three colors are visually perceived as a single composite color picture element.

However, in the apparatus, among the read light (a white light) passing through the LCD and impinging on the color filter, only one primary color of the three primary ones is utilized and the rests are excluded, resulting in a low availability of the light. The reason is as follows:

1) When a white light beams is irradiated on the transmitting LCD panel as a read light, a light beam corresponding to a certain color among the three colors only passes through a color filter corresponding to the certain color. Thus, an amount of about ⅔ of the white light beam is not utilized. Further, a transmittance of the color filter is so small that the efficiency of light beam availability becomes much smaller.

2) The transmission type LCD panel is provided with a black matrix surrounding cells as picture elements. Thus, a aperture ratio is small, resulting in a low availability of a light beam because the light beam irradiated on the black matrix is wasted.

As a countermeasure, in Japanese Laid-open Patent Publication 6-308332/1994, there is disclosed a color filter employing a transmissive hologram for a spatial light modulation section used in a transmission type color image display apparatus.

FIG. 27 is a partial schematic side view for explaining operations of a spatial light modulation section in the prior art.

In FIG. 27, a reference character 51 denotes an LCD panel having a plurality of R, G, B-transparent picture element electrodes 51r, 51g, 51b. A reference character 52 denotes a color filter composed of a transmissive hologram including a plurality of unit holograms 52p for spectrally diffracting a read light into respective 3-color lights.

The separated 3-color lights diffracted by the color filter 52 are converged on the plurality of R, G, B-transparent picture element electrodes 51r, 51g, 51b correspondingly with the 3-colors.

According to this prior art, it is possible to utilize almost all the read light by diffracting the read light at a different angle corresponding to the 3-colors with the plurality of unit holograms 52.

As another countermeasure, in Japanese Laid-open Patent Publication 2-500937/1990 corresponding to U.S. Pat. No. 4,807,978, there is disclosed a reflection type spatial light modulation section together with the transmission type color image display apparatus, wherein the transmissive hologram of the color filter is composed of three holographic lens array layers.

FIG. 28 is a partial schematic side view for explaining a function of a spatial light modulation section in the prior art.

In FIG. 28, a reference character 61 denotes a color filter having R, G, B-holographic lens array layers 61r, 61g, 61b, and 62 a glass substrate and 63 a reflective LCD panel.

The reflective LCD panel is composed of a transparent common electrode 64, a liquid crystal layer 65, a reflecting layer 66 and a picture element electrode layer 67 on which a plurality of R, G, B-picture element electrodes 67r, 67g, 67b are disposed. To each of the plurality of R, G, B-picture element electrodes 67r, 67g, 67b, an electric potential is applied from a back side of the LCD panel by a scanning electron beam or a controlling light beam.

The color filter 61 is composed of the R-holographic lens array 61r for exclusively diffracting the R-color light the G-holographic lens array 61g for exclusively diffracting the G-color light, the B-holographic lens array 61b for exclusively diffracting the B-color light in a laminated structure. As shown in FIG. 28, a pitch of the holographic lenses is three times as large as that of the picture element electrodes.

In this spatial light modulation section, a read light (or an incident light) is irradiated on the color filter 61 so that each of quasi-holographic lenses of the color filter 61 diffracts a color light and converges it on a corresponding picture element electrode disposed on an optical axis of the quasi-holographic lenses.

The quasi-holographic lenses are partially superimposed to each other in the construction, however, each of the quasi-holographic lenses exclusively diffracts the corresponding color light. Specifically, the R-holographic lens array only diffracts the R-color light and allows to pass through the rests of the G, B-color lights, the G-holographic lens array only diffracts the G-color light and allows to pass through the rests of the R, B-color lights, and the B-holographic lens array only diffracts the B-color light and allows to pass through the rests of the R, G-color lights.

As a result, the R, G, B-color lights diffracted by the R, G, B-holographic lens array layers 61r, 61g, 61b impinge on the liquid crystal layer 65, and are respectively reflected by the reflecting layer 66 corresponding to R, G, B-picture element electrodes 67r, 67g, 67b. Thus, they impinge again on the R, G, B-holographic lens array layers 61r, 61g, 61b by being modulated by the liquid crystal layer 65 on their ways between the reflecting layer 66 and the R, G, B-holographic lens array layers 61r, 61g, 61b, and the modulated color lights are diffracted again by R, G, B-holographic lens array layers 61r, 61g, 61b to be outputted therefrom to a direction of a light source of the read light.

Generally, in order to increase a diffraction efficiency (a ratio of an intensity of one order diffraction light to an intensity of the incident light) of a hologram, it is necessary to increase a bend angle defined as an angle between the one order diffraction light and the incident light.

Thus, in the Japanese Laid-open Publication 2-500937/60, upon producing the quasi-hologram lenses of the color filter 61, an angle θ between a reference light (an incident light) and an object light (diffracted light) are made to be large, wherein the angle θ is equal to an incident angle of the reference light.

However, in the prior art, the modulated R, G, B-color lights are returned to the direction of the light source of the read light as mentioned in the foregoing. For this reason, although there is not disclosed in the Japanese Laid-open Publication 2-500937/60, it will be necessary to provide a polarization beam splitter to separate the projection light from the read light in an incident optical system if this color filter is applied to a color image display apparatus. In other words, the read light is allowed to impinge on the color filter 61 through the polarization beam splitter, and the modulated read light (projection light) from the spatial light modulation section impinging again on the color filter is outputted therefrom and separated by the polarization abeam splitter. The provision of the polarization beam splitter in the incident optical system causes reductions of a contrast ratio and availability of light, and a problem of a high production cost because the polarization beam splitter itself is very expensive.

On the other hand, it is well known that the smaller the bend angle of the hologram mentioned in the foregoing becomes, the lager a difference of diffraction efficiency between a P-polarized component (a light component having a plane of vibration parallel to an incident plane of an incident light) and an S-polarized component (a light component having a plane of vibration vertical to the incident plane thereof) of an incident light becomes.

Generally, the diffraction efficiency "η" of the transmissive hologram depends on an amount of modulation "Δn" of refractive index and a thickness thereof "t" and an incident angle "θ". When the incident angle "θ" is set up as large as 60° to 90°, a diffraction efficiency "ηp" of the P-polarized component and a diffraction efficiency "ηs" of the S-polarized component respectively are apt to behave a periodic change with respect to changes represented by a function F (Δn, t) as shown in FIG. 29.

FIG. 29 is a graph showing a diffraction efficiency "ηp" of the P-polarized component and a diffraction efficiency "ηs" of the S-polarized component with respect to changes represented by a function F (Δn, t).

And, under a condition that both the "Δn" and "t" are constant, when the incident angle "θ" is decreased as small as 0°, the characteristic of the diffraction efficiency "ηp" of the P-polarized component and that of the diffraction efficiency "ηs" of the S-polarized component has a similar periodic characteristic, resulting in the same one in principle when "θ"=0.

Accordingly, in the changes of the diffraction efficiency of the "ηp" and "ηs" shown in FIG. 29, it is possible to allow the "ηp" of the P-polarized component to be, for instance, about 18% under a condition that the "ηs" of the S-polarized component is held to be a maximum of 100% by setting up the incident angle "θ" to be 75°.

In this regard, the inventors of the present invention has devised a useful color filter applicable to the color image display apparatuses capable of displaying the composite color image with a high contrast ratio and a high availability of light without providing the polarization beam splitter.

SUMMARY OF THE INVENTION

Accordingly, a general object of the present invention is to provide a color filter and a color image display apparatus in which the above disadvantages have been eliminated.

A specific object of the present invention is to provide a color filter provided with hologram means for spectrally diffracting an incident light into a plurality of light beams of different wavelength regions, and selectively converging the plurality of light beams on respective plurality of picture element electrodes corresponding to the different wavelength regions, wherein the hologram means has such characteristics that S-polarized components of the incident light are diffracted at an approximately a maximum diffraction efficiency at a predetermined incident angle of the incident light, and P-polarized components of the incident light are diffracted such that a difference between the maximum diffraction efficiency of the first polarized components and the diffraction efficiency of the second polarized components is not less than 30%, and diffracted S-polarized components are formed as the plurality of lights to be converged on the plurality of picture element electrodes corresponding to the different wavelength regions wherein polarization directions of the S-polarized component and the P-polarized components are orthogonal to each other.

Another specific object of the present invention is to provide A color image display apparatus for projecting a composite color light beams on a screen as a color image comprising: a light source for generating a read light; a spatial light modulation section including a color filter having at least hologram means, a light modulation layer and a light reflecting layer having a layer of a plurality of picture element electrodes, wherein the hologram means having such characteristics that S-polarized components of the incident light are diffracted at an approximately a maximum diffraction efficiency at a predetermined incident angle of the incident light, and P-polarized components of the incident light are diffracted such that a difference between the maximum diffraction efficiency of the S-polarized components and the diffraction efficiency of the P-polarized components is not less than 30%, and diffracted S-polarized components are formed as the plurality of lights to be converged on the plurality of picture element electrodes corresponding to the different wavelength regions wherein polarization directions of the S-polarized component and the P-polarized components are orthogonal to each other; an incident optical system for allowing the read light to impinge on the spatial light modulation section; and a projection optical system for projecting the read light modulated by the spatial light modulation section on a screen, wherein the color filter spectrally diffracts the S-polarized components of the read light impinging thereon into a plurality of light beams of different wavelength regions, and selectively converges the plurality of light beams on the plurality of picture element electrodes corresponding to the different wavelength regions through the light modulation section, and diffracted S-polarized components of the read light reflected by the light reflecting layer impinge again on the color filter by being modulated in a polarization mode by the light modulation layer of the spatial light modulation section, and polarizingly modulated S-polarized components pass through the color filter and are projected by the projection optical system on the screen.

Other specific object of the present invention is to provide a color image display apparatus for projecting a composite color light beams on a screen as a color image comprising: a light source for generating a read light; a spatial light modulation section including a color filter at least having a holographic lens array layer having a plurality of holographic lenses, a light modulation layer and a reflecting layer, each of the holographic lenses having such characteristics that a first polarized components of the incident light are diffracted at an approximately maximum diffraction efficiency at a predetermined incident angle of the incident light, and second polarized components of the incident light are diffracted such that a difference between the maximum diffraction efficiency of the first polarized components and the diffraction efficiency of the second polarized components is not less than 30%, and diffracted first polarized components are formed as the plurality of lights to be converged on the plurality of picture element electrodes corresponding to the different wavelength regions wherein polarization directions of the first polarized component and the second polarized components are orthogonal to each other, the plurality of holographic lens array layer having a predetermined color pattern in the holographic lens array layer, the plurality of picture element electrodes being disposed as an electrode layer and having a same predetermined color pattern as that of the plurality of holographic lenses, the holographic lens array layer and the electrode layer being disposed horizontally as such that the read light filtered to a specific color by a holographic lens for the specific color reaches a picture element electrode for the same specific color, wherein a center of of the holographic lens for the specific color and a center of the picture element electrode for the same specific color are displaced horizontally at a predetermined distance each other; an incident optical system for allowing the read light to impinge on the spatial light modulation section; and, a projection optical system for projecting the read light modulated by the spatial light modulation section on a screen, wherein the color filter spectrally diffracts the firs polarized components of the read light impinging thereon into a plurality of light beams of different wavelength regions, and selectively converges the plurality of light beams on the plurality of picture element electrodes corresponding to the different wavelength regions through the light modulation section, and diffracted first polarized components of the read light reflected by the light reflecting layer impinge again on the color filter by being modulated in a polarization mode by the light modulation layer of the spatial light modulation section, and polarizingly modulated first polarized components pass through the color filter and are projected by the projection optical system on the screen.

Other specific object of the present invention is to provide a color image display apparatus for projecting a composite color light beams on a screen as a color image comprising: a light source for generating a read light; a polarized light separation means for separating the read light into first polarized components and second polarized components; a first light modulation section; a second light modulation section; a first incident optical system for allowing the first polarized components to impinge on the first light modulation section for undergoing a color modulation thereby; a second incident optical system for allowing the second polarized components to impinge on the second light modulation section for undergoing an intensity modulation thereby; and a projection optical system for projecting on a screen, color modulated first polarized components by the first light modulation section, and intensity modulated second polarized components by the second light modulation section, the first light modulation section including a color filter having at least hologram means, a first light modulation layer and a first light reflecting layer having a layer of a plurality of first picture element electrodes, the hologram means having such characteristics that the first polarized components of the incident light are diffracted at an approximately a maximum diffraction efficiency at a predetermined incident angle of the incident light, and the second polarized components of the incident light are diffracted such that a difference between the maximum diffraction efficiency of the first polarized components and the diffraction efficiency of the second polarized components is not less than 30%, and diffracted first polarized components are formed as the plurality of lights to be converged on the plurality of picture element electrodes corresponding to the different wavelength regions wherein polarization directions of the first polarized component and the second polarized components are orthogonal to each other; the second spatial light modulation section including a second light modulation layer operating in synchronization with the first spatial light modulation section and a second reflecting layer having a plurality of second picture element electrodes disposed corresponding to the plurality of first picture element electrodes, and means for synthesizing the color modulated first polarized components and the intensity modulated second polarized components together to be projected by the projection optical system, wherein the synthesizing means directs the color modulated first polarized components to the projection optical system, and directs the second polarized components to the second light modulation section, and allows to pass straight the intensity modulated second polarized components from the second light modulated section to the projection optical system to form a single beam of composite light.

Other objects and further features of the present invention will be apparent from the following detailed description.

BRIEF DESCRIPTION OF DRAWINGS

FIG. 2 (B) is a plan view showing R, G, B-electrodes in vertical stripes;

FIG. 2 (C) is a plan view showing R, G, B-electrodes in a delta alignment;

FIG. 24 (B) is a schematic back view of the color image display apparatus shown in FIG. 24 (A);

FIG. 25 (B) is a schematic back view of FIG. 25(A);

FIG. 26 (B) is a schematic back view of FIG. 26(A);

DETAILED DESCRIPTION OF THE PREFERRED EMBODIMENTS

The description is given of embodiments of the present invention referring to FIGS. 1 to 26.

[Embodiment 1]

Figure 1:
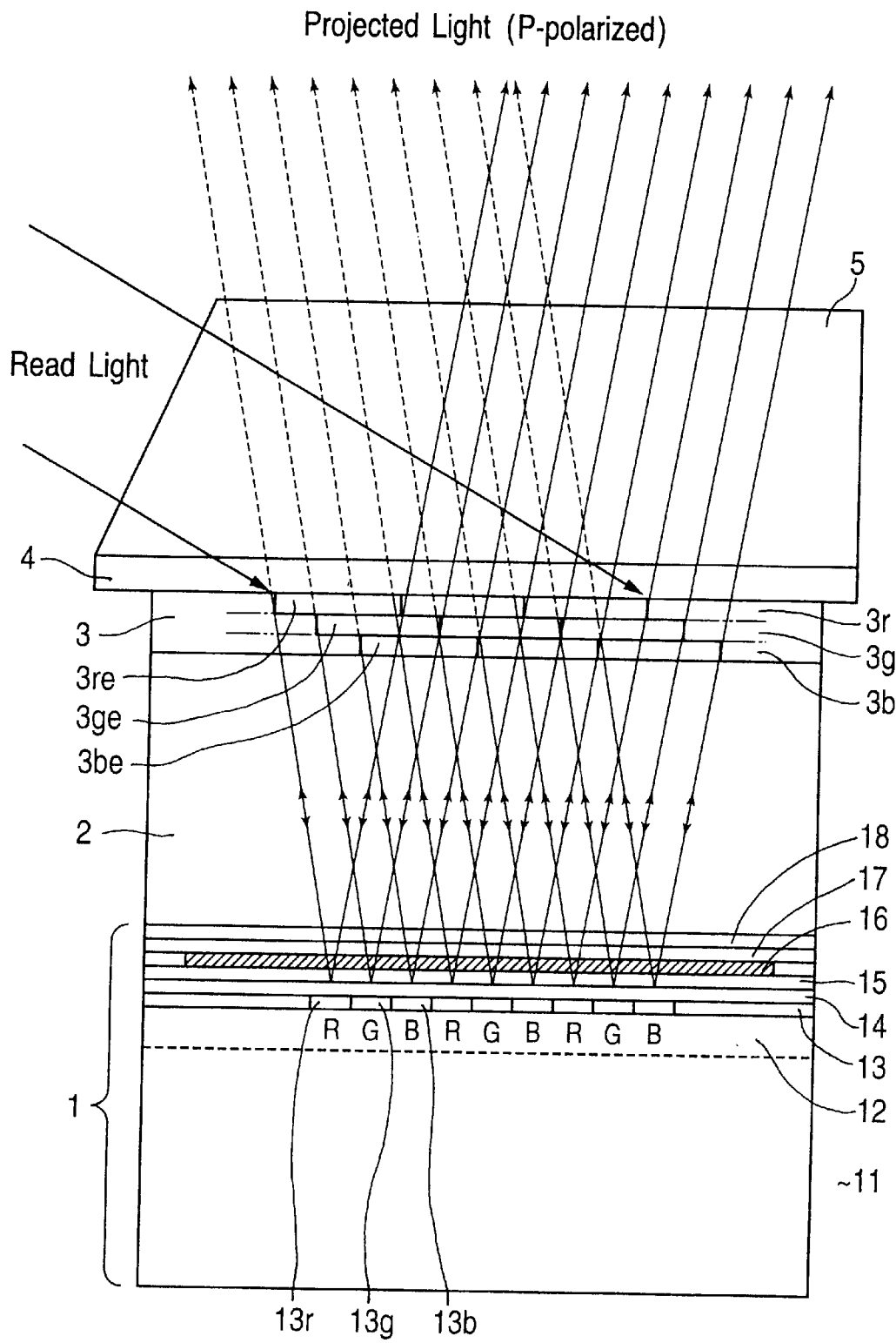
FIG. 1 is a schematic fragmentary sectional view showing a spatial light modulator section applied to a reflection type color image display apparatus according to the present invention.

FIG. 1 is a schematic fragmentary sectional view showing a spatial light modulator section applied to a reflection type color image display apparatus according to the present invention.

In FIG. 1, a reference character 1 notes an LCD panel, 2 a thin glass layer, 3 a color filter, 4 a glass plate, and 5 a coupling prism. Here, the LCD panel 1 comprises a glass substrate (or S1 substrate) 11, an active matrix driving circuit 12 formed on the glass substrate 11, a picture element electrode layer 13 having R, G, B-picture element electrodes (referred to as R, G, B-electrodes) 13r, 13g, 13b for being selectively controlled by the active matrix driving circuit 12, 14 a dielectric mirror layer, 15 an aligning layer, 16 a light modulation layer, 17 an aligning layer, and 18 a transparent common electrode layer (referred to as common electrode layer). These components are laminated in this order.

Next, a description is given of constructive components other than the above components or well known components.

The R, G, B-electrodes 13r, 13g, 13b of the picture element electrode layer 13 are provided corresponding to R, G, B colors, and a unit picture element is composed of a group of R, G, B-electrodes 13r, 13g, 13b. Generally, as alignment states of the R, G, B-electrodes 13r, 13g, 13b in plane, there are a mosaic alignment, a stripe alignment and a delta alignment as shown in FIG. 2 (A) to (C).

Figure 2A:
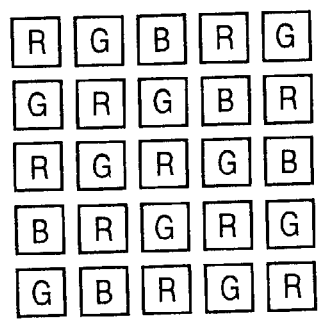
FIG. 2 (A) is a plan view showing R, G, B-electrodes in a mosaic alignment.
Figure 2B:
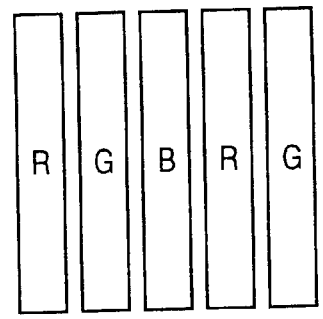

FIG. 2 (A) is a plan view showing R, G, B-electrodes in a mosaic alignment;

FIG. 2 (B) is a plan view showing R, G, B-electrodes in vertical stripes; and FIG. 2 (C) is a plan view showing R, G, B-electrodes in a delta alignment.

Figure 3:
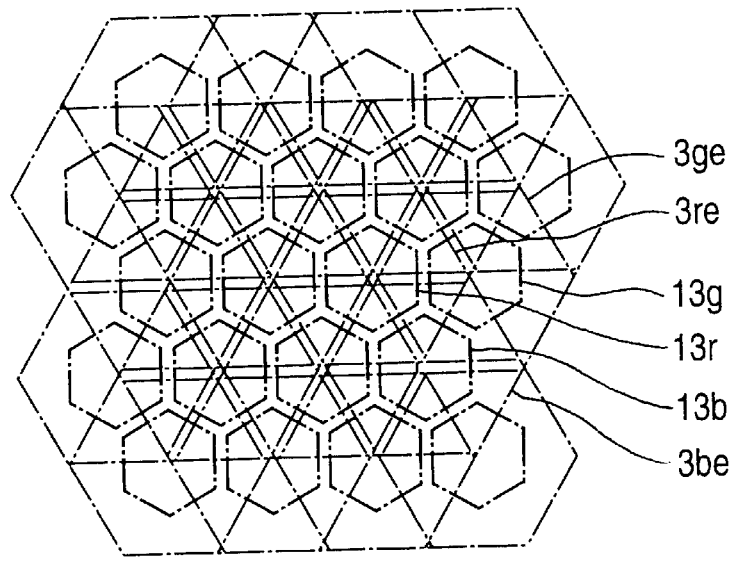
FIG. 3 is a plan view showing the R, G, B-electrodes disposed in hexagonal close-packed state and a relation between the R, G, B-electrodes and the R, G, B-holographic lenses.

Usually, in the delta alignment, a hexagonal close-packed structure is employed as shown in FIG. 3.

FIG. 3 is a plan view showing the R, G, B-electrodes disposed in hexagonal close-packed state and a relation between the R, G, B-electrodes and the R, G, B-holographic lenses.

Figure 2C:
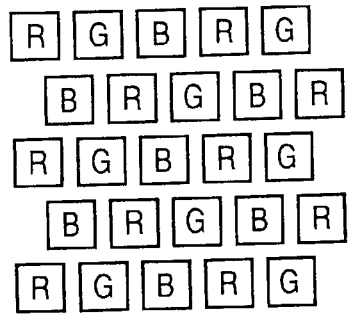

In this embodiment, the delta alignment shown in FIG. 3 is employed as the alignment of the R, G, B-electrodes, wherein R, G, B-electrodes are disposed in a series of R, G, B-electrodes in a lateral direction as shown in FIG. 2(C) and the R, G, B-electrodes are adjacent to each other in a plan view.

Further, there may be provided a light-blocking layer (not shown) between the picture element electrode layer 13 and an active matrix driving circuit 12 for preventing the light beam from reaching to the glass substrate 11 and developing a photo-conduction.

As the light modulation layer 16, a liquid crystal operating in a TN mode, an HF mode, an HFE mode, an FLC mode or a DS mode can be employed. However, the aligning layers 15, 17 are provided depending on a kind of the liquid crystal. Thus, the aligning layers 15, 17 are omitted when a scattering type liquid crystal operating in the DS mode is employed.

The coupling prism 5 is composed of a plane glass, and has a slant surface at one side thereof as an incident surface to allow a read light to impinge thereon vertically, and has a top surface thereon as an output surface to allow a projection light to output therefrom. In FIG. 1, there is provided the glass plate 4 interposed between the coupling prism 5 and the color filter 3. The glass plate 4 may be integrally formed with the coupling prism 5 or formed separately, however, it is necessary to closely contact with the surface of the coupling prism 15.

Further, in FIG. 1, thicknesses of the glass plate 4 and the coupling prism 5 are depicted thinner than that of the thin glass layer 2 for convenience, but they are actually made larger than that of the thin glass layer 2.

The color filter 3 is a main component of the present invention. Thus, a detailed explanation is given of the color filter 3.

In the color filter 3, a transmission type hologram is formed by using holographic lens array layers in the same manner as mentioned in the prior art of Japanese Laid-open Patent 2-500837/1990. The color filter 3 has a function for spectrally diffracting an incident light including R, G, B primary color lights into the R, G, B-lights and converging them vertically on the R, G, B-electrodes 13r, 13g, 13b corresponding to the 3-colors. In other words, the color filter 3 causes a principal ray of each of the R, G, B-lights to impinge approximately vertically on each of the R, G, B-electrodes 13r, 13g, 13b, and each of the R, G, B-lights is converged on the surface of each of the R, G, B-electrodes 13r, 13g, 13b caused by a lens function of the R, G, B-holographic lens array layers 3r, 3g, 3b.

Actually, over the R, G, B-electrodes 13r, 13g, 13b, there is provided the dielectric mirror layer 14 as shown in FIG. 1, however, the thickness thereof is very small compared with those of the R, G, B-electrodes 13r, 13g, 13b. Thus, the description that "the light beam is converged on the surfaces of the R, G, B-electrodes" and the like are used hereinafter.

The abovementioned transmission type hologram is composed of three layers, i.e., the R, G, B-holographic lens array layer 3r, 3g, 3b. Each of the R, G, B-holographic lens array layers 3r, 3g, 3b is composed of the R-holographic lenses 3re, of G-holographic lenses 3ge or of B-holographic lenses 3be. Each holographic lens thereof corresponds to a unit hologram. Each of the R, G, B-holographic lenses 3re, 3ge, 3be is disposed so that an optical axis thereof approximately passes through a center of each of R, G, B-electrodes 13r, 13g, 13b.

In this embodiment, the R, G, B-electrodes 13r, 13g, 13b are disposed in the hexagonal close-packed state as shown in FIG. 3. Thus, each of the R, G, B-holographic lens array layers 3r, 3g, 3b is disposed corresponding to each of the alignment of the R, G, B-electrodes 13r, 13g, 13b.

Specifically, for instance, from a view point of a single layer of the R-holographic lens array layer 3r, the R-holographic lenses 3re are disposed at the same pitch (one color pitch) as that of the R-electrodes 13re corresponding to the R-color. However, from a view point of a laminated state of the R, G, B-holographic lens array layers 3r, 3g, 3b in a plan view, the R, G, B-holographic lenses 3re, 3ge, 3be are mutually superimposed partially and are disposed at a ⅓ pitch of the one color pitch mentioned above.

Further, each holographic lens of the R, G, B-holographic lenses 3re, 3ge, 3be, which corresponds to a unit hologram, is formed so as to spectrally diffract an S-polarized light component (referred to as S-polarized component) of the incident light from a P-polarized light component (referred to as P-polarized component) having a wavelength within a certain color wavelength region.

Figure 4:
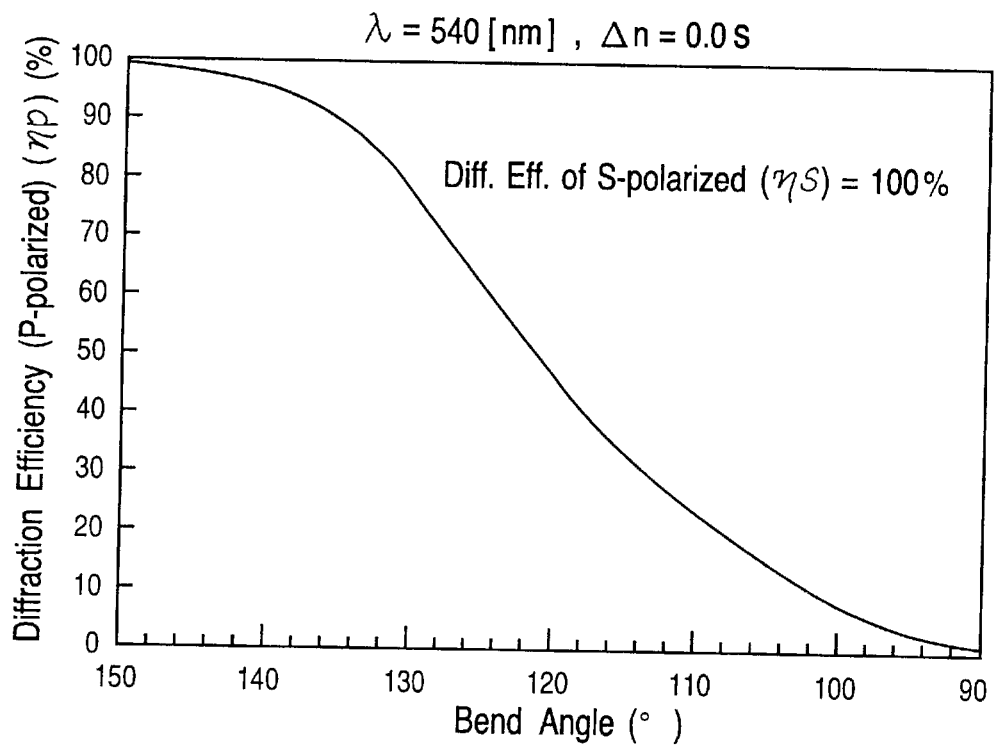
FIG. 4 is a graph for explaining a relation between a bend angle and a diffraction efficiency $\eta p$.

An explanation is given of diffraction characteristic of the R, G, B-holographic lenses 3re, 3ge, 3be referring to FIG. 4.

FIG. 4 is a graph for explaining a relation between a bend angle and a diffraction efficiency ηp, wherein as an example, a diffraction efficiency of the P-polarized component is obtained by a calculation under conditions of a wavelength of an incident light: 540 nm, a modulation value Δn of a refractive index to a hologram sensitizing member: 0.03, and that the diffraction efficiency of the S-polarized component becomes 100% by optimizing a thickness "t" of the hologram at every bend angle.

As seen from FIG. 4, both the P-polarized component and the S-polarized component are diffracted approximately by 100% by causing the bend angle to be large. Further, it is possible to reduce the diffraction efficiency of the P-polarized component to be less than 50% by causing the bend angle to be less than 120°, and 0% by causing bend angle to be approximately 90°.

Further, the above diffraction efficiency shows a strong dependency on a wavelength of the incident light. However, this dependency on the wavelength enables to provide an optimum design such that an S-polarized component with a desired wavelength is diffracted at a diffraction efficiency of nearly 100% and a P-polarized component therewith is hardly diffracted.

Accordingly, it is possible to produce a color filter employing the transmission type holograms composed of R, G, B-holographic lens array layers capable of diffracting the S-polarized component within a corresponding wavelength region at a high diffraction efficiency and suppressing the diffraction efficiency of the P-polarized component at a low one.

Figure 5:
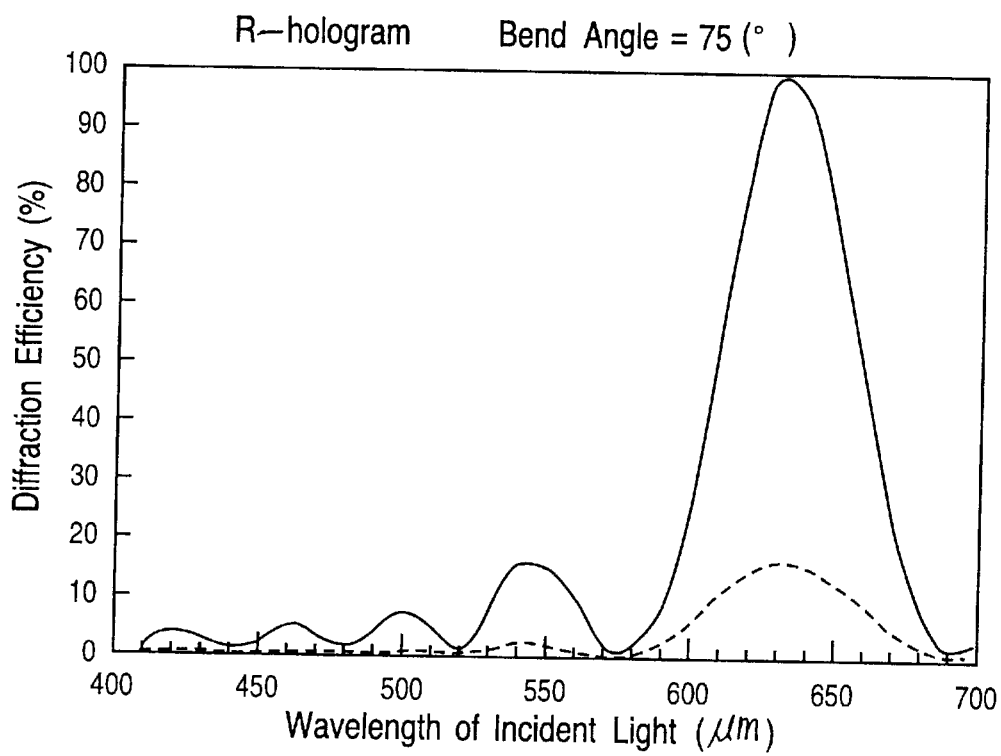
FIG. 5 shows a relation between a diffraction efficiency and a wavelength of an incident light with respect to R hologram on the basis of an optimum condition at a bend angle of 75°.
Figure 6:
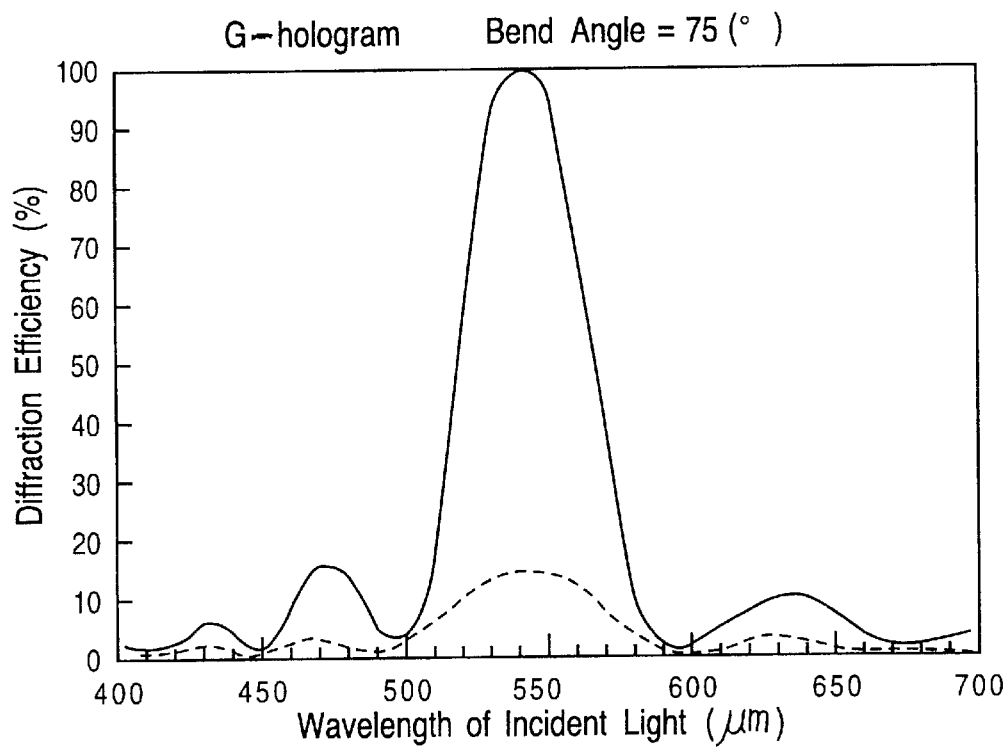
FIG. 6 shows a relation between a diffraction efficiency and a wavelength of an incident light with respect to G hologram on the basis of an optimum condition at a bend angle of 75°.
Figure 7:
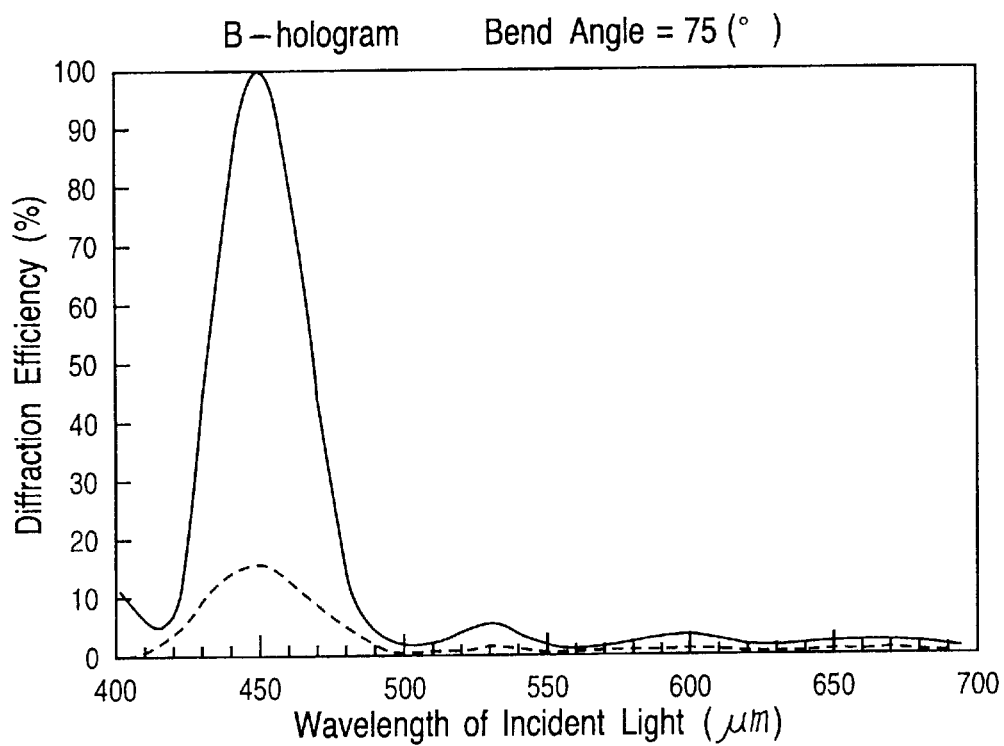
FIG. 7 shows a relation between a diffraction efficiency and a wavelength of an incident light with respect to B hologram on the basis of an optimum condition at a bend angle of 75°.

FIGS. 5 to 7 respectively show a relation between a diffraction efficiency and a wavelength of an incident light with respect to R, G, B holograms on the basis of an optimum condition at a refractive bend angle of 75°.

In FIGS. 5 to 7, a real line represents the S-polarized component and a dotted line represents the P-polarized component, wherein the S-polarized component shows the diffraction efficiency of 100% at a center wavelength in each of R, G, B regions and the P-polarized component shows a diffraction efficiency of less than 18%.

Figure 8:
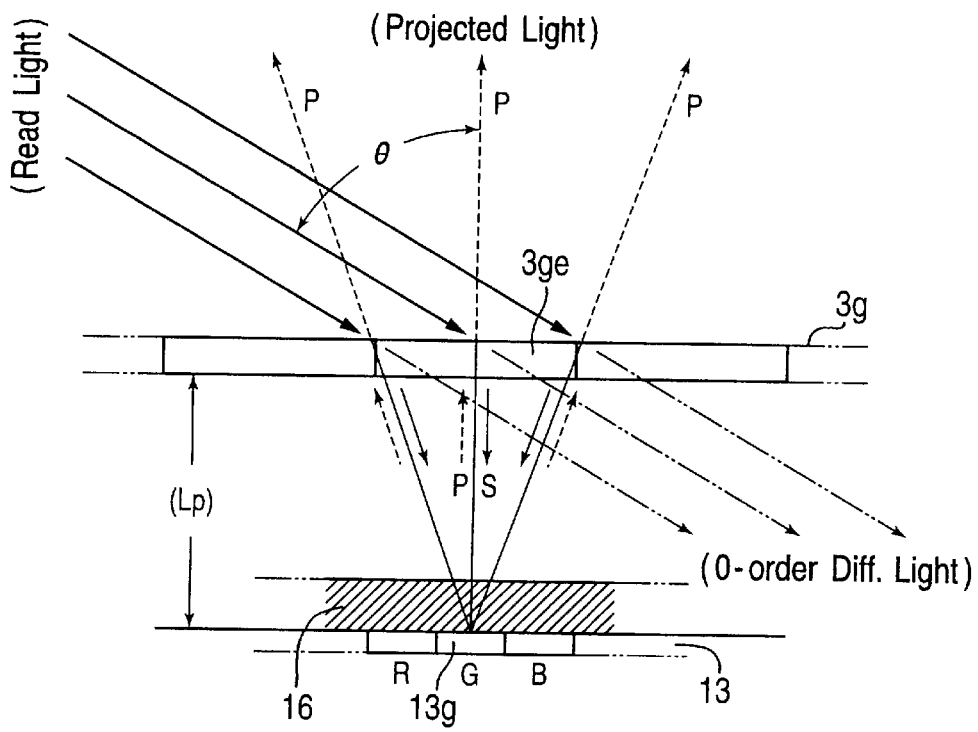
FIG. 8 is a schematic side view for exemplarily explaining a positional relation between a G-holographic lens and a G-electrode in in the embodiment 1 of the present invention.

When the above color filter having the characteristic shown in FIGS. 5 to 7 is applied to the color filter 3 shown in FIG. 1, the R, G, B-holographic lenses 3re, 3ge, 3be can diffract mainly the S-polarized component regarding each color region, and output the S-polarized component to the R, G, B-electrodes 13r, 13g, 13b vertically by causing the incident angle θ of the read light to be 75° (bend angle: 105°, (180°–75°)) as shown in FIG. 8.

FIG. 8 is a schematic side view for exemplarily explaining a positional relation between a G-holographic lens and a G-electrode in in the embodiment 1 of the present invention.

In this embodiment of the color filter 3, each of the R, G, B-holographic lens array layers 3r, 3g, 3b having the dependency of the diffraction efficiency on the wavelength is produced independently on a hologram sensitizing member at every color (R, G, B), then the color filter 3 is formed by laminating thus produced hologram sensitizing members. However, it; is possible to multiply produce the R, G, B-holographic lens array layers 3r, 3g, 3b having the dependency of the diffraction efficiency on the wavelength on a single sensitizing member, resulting in no need of a mechanical alignment of the 3 independent layers.

The read light generated from the light source (not shown) impinges vertically on the incident surface of the coupling prism 5 through an incident optical system (not shown) and the glass plate 4, and impinges on the color filter 3 at an incident angle of 75° through the coupling prism 5 and the glass plate 4.

First, the read light impinging on the color filter 3 is spectrally diffracted by the R-holographic lens array 3r.

The R-holographic lenses 3re of the R-holographic lens array layer 3r are provided for diffracting mainly the S-polarized component of the incident read light within the R-wavelength region and allows to pass therethrough the P-polarized component within the R-wavelength region and light components other than the R-wavelength region contained in the read light as they are.

Specifically, each of the R-holographic lenses 3re diffracts the S-polarized component within the R-wavelength region at a diffraction efficiency of nearly 100%, and restricts the diffraction of the P-polarized component at a diffraction efficiency of not more than 20%, and behaves so as to converge the diffracted light as a convergent bundle of rays on the R-electrode 13r by its lens function.

Incidentally, the P-polarized component within the R-wavelength region is slightly diffracted (less than 20%) and is made to be a convergent bundle of rays on the R-electrode 13r as well.

Thus, each of the R-holographic lenses 3re causes the S-polarized component and the slightly diffracted P-polarized component both in the R-wavelength region to impinge on the G-holographic lens array layer 3g vertically, and allows to pass therethrough a rest of light components including undiffracted P-polarized R-component to the G-holographic lens array layer 3g in an original direction of the incident light (read light) to the coupling prism 5.

Next, each of the G-holographic lenses 3ge of the G-holographic lens array layer 3g is provided for mainly diffracting the S-polarized component within the G-wavelength region. Thus, each of the holographic lenses 3ge diffracts at a diffraction efficiency of nearly 100% the S-polarized component of the G-wavelength region among the light components passed straight through the the R-holographic lens array layer 3r in an original direction of the incident light to the coupling prism 5, and suppresses the diffraction of the P-polarized G-component thereof to a diffraction efficiency of no more than 20%. As a result, thus diffracted components are made to be a convergent bundle of rays onto the G-electrode 13g located on one side of the LCD panel 1 and along an optical axis of each of the G-holographic lenses 3ge.

On the other hand, each of the G-holographic lenses 3ge allows to pass thererthrough vertically the S-polarized component and a few P-polarized diffracted component both in the R-wavelength region to impinge on the B-holographic lens array layer 3b as they are, and allows to pass therethrough in their original direction, the rest of the light component impinging on the holographic lens array layer 3g, such as light components other than the diffracted R and G S-polarized components, namely, the P-polarized component within the R-wavelength region and the P-polarized component, both are not diffracted in the R and G holographic lens array layers 3r and 3g.

Next, each of the B-holographic lenses 3be of the B-holographic lens array layer 3b is provided for mainly diffracting the S-polarized component within the B-wavelength region. Thus, each of the B-holographic lenses 3be diffracts at a diffraction efficiency of nearly 100% the S-polarized component of the B-wavelength region among the light components impinging thereon, and suppresses the diffraction of the P-polarized G-component thereof to a diffraction efficiency of no more than 20%. As a result, thus diffracted components are made to be a convergent bundle on the B-electrode 13b located on one side of the LCD panel 1 and along an optical axis of each of the B-holographic lenses 3be.

On the other hand, each of the B-holographic lenses 3be allows to pass therethrough vertically R and G convergent bundle of rays impinging thereon vertically onto the thin glass layer 2 as they are, and allows to pass straight therethrough other components which are not diffracted by the R, G and B-holographic lens array layers 3r, 3g, and 3b, namely, the P-polarized components within the R, G and B-wavelength regions which are not diffracted, in the direction of the original incident light to the coupling prism 5.

As a result, from the color filter 3, there are outputted 3-convergent bundles of rays and other lights as follows:

(1) a group of convergent bundles of rays composed of the S-polarized components and the slight P-polarized components within the R-wavelength region to converge on the R-electrodes 13r.

(2) a group of convergent bundles of rays composed of the S-polarized components and a small amount of the P-polarized components within the G-wavelength region to converge on the G-electrodes 13g.

(3) a group of convergent bundles of rays composed of the S-polarized components and a small amount of the P-polarized components within the B-wavelength region to converge on the B-electrodes 13b.

(4) a group of 0-order diffraction lights such as light components having specific polarization and other than the above three color wavelength regions and a majority of P-polarized components in the three color wavelength regions.

After the groups of convergent bundles of rays identified in (1) to (3) impinge on the LCD panel 1 through the thin glass layer 2, each of the S-polarized components of the groups is converged on each corresponding electrode of the R, G, B-electrodes 13r, 13g, 13b through the common electrode layer 18, the aligning layer 17, the light modulation layer 16 and the aligning layer 15, and is reflected by the dielectric mirror layer 14, and impinges again on each corresponding lens of the R, G, B-holographic lenses 3re, 3ge, 3be of the color filter 3 as a diverging bundle of rays.

However, between each of the R, G, B-electrodes 13r, 13g, 13b and the common electrode layer 18, there is given a control voltage corresponding to a picture signal for determining a state of a picture element 18 of the LCD by the active matrix driving circuit 12. Thereby, the aligning state of moleculars of the liquid crystal of the light modulation layer 16 changes. Thus, the S-polarized components of (1) to (3) mentioned in the foregoing are modulated corresponding to the applied voltages on their paths between the color filter and the LCD panel 1, and impinge on the R, G, B-holographic lenses 3re, 3ge, 3be again.

Specifically, when an S-polarized component is modulated by a rate of X%, the S-polarized component of (100%-X%) remains as they are, but the S-polarized component of X% is converted upon modulation into the P-polarized component to impinge on one of the R, G, B-holographic lenses 3re, 3ge, 3be.

This state is schematically shown in FIG. 8 as mentioned hereinafter.

The S-polarized component diffracted by the G-holographic lens 3ge is converged approximately at a center of the G-electrode 13g located along the optical axis of the G-holographic lens 3ge. At that time, the modulated S-polarized component impinges again on the G-holographic lens 3ge through a optical path symmetric to the optical axis of the G-holographic lens 3ge. Here, in FIG. 8, the incident angle and the reflected angle are exaggeratedly depicted. Actually, they are very small because the size of the G-holographic lens 3ge is very small.

As mentioned in the foregoing, the G-holographic lens 3ge diffracts the S-polarized component at a diffraction efficiency of nearly 100%, and the P-polarized component at a diffraction efficiency of about 20%, and makes them a convergent bundle of rays to advance to the center of the G-holographic lens 13ge.

Accordingly, about 20% of the P-polarized component impinging again on the G-holographic lens 3ge returns in the direction of the incident light (read light) based on the light retracement law by being diffracted by the holographic lens 3ge, however, other P-polarized component passes through the G-holographic lens 3ge as it is. This is true to G and B colors.

As a result, the P-polarized components obtained by the modulation regarding the R, G, B colors passes through the color filter 3, and they are outputted from the output surface of the coupling prism 5 therethrough, and projected on the screen by a projection optical system (not shown).

However, the S-polarized component caused by a rate of modulation and the S-polarized component developed by modulating the P-polarized component which the read light is diffracted by the color filter 3 pass through the color filter 3 as will be mentioned hereinafter. But, these S-polarized components can be removed by employing a polarizing device for transmitting only the P-polarized component.

On the other hand, the O-order diffraction lights mentioned in (4) impinge on the LCD panel 1 at an incident angle of 75° traveling through the thin glass layer 2, and are reflected at an reflection angle of −75° by the dielectric mirror 14, and impinge again on the color filter 3. However, the R, G, B-holographic lenses 3re, 3ge, 3be of the R, G, B-holographic lens array layers 3r, 3g, 3b have no diffraction ability at an incident angle of −75°. Thus, the 0-order diffraction lights impinging again on the color filter 3 pass through the color filter 3 and are outputted from an opposite side of the incident surface of the coupling prism 5 through the glass substrate 4 without being diffracted.

In this embodiment, the description is given of a case where the incident angle of the read light is 75° to the color filter 3.

Generally, there is a relation of Sr=Sa cos θ, wherein Sr: a section Sr of a bundle of rays of the read light, Sa: an irradiated area on the color filter and θ: an incident angle to the color filter. As the section Sr is constant, the irradiated area Sa becomes very small when the incident angle θ is large, resulting in a reduction of an illumination efficiency.

In the projection type color image display apparatus, in order to improve the contrast ratio and the color redproducibilty, it is preferable to irradiate a read light as parallel as possible. However, it is impossible to obtain such a parallel read light because the light source is not an ideal point source but has a certain size.

For the above reason, it is difficult to effectively converge the read light to such a small area in the color filter 3 mentioned in the foregoing. As a countermeasure, it is desirable to make the section of the bundle of rays of the read light to be as large as possible to increase the efficiency of availability of the irradiating light.

However, a first condition and a second condition mentioned below are contradictory to each other, i.e., the first condition that an incident angle θ of the read light is made to be as large as possible to obtain a high contrast ratio by causing the diffraction efficiency of the S-polarized component which contributes to an intensity of the projected light, and by causing the diffraction efficiency of the P-polarized component to be small, and a second condition that the efficiency of the read light should be as large as possible.

In this embodiment, the incident angle θ is made to be 75°. However, when the incident angle θ is made to be 60°, the illumination efficiency becomes about double as large as that in the case of incident angle of 75°.

It is noted that when the incident angle θ is made to be 60°, it is verified that the quality such as the contrast ratio of the projected image is improved compared with that in the case of incident angle of 75°, though the diffraction efficiency is somewhat degraded. In other words, the incident angle of 60° is more preferable taking account of the illumination efficiency.

[Embodiment 2]

In the embodiment 1 explained in the foregoing, when the P-polarized component modulated by the light modulation layer 16 is outputted from the color filter 3, a part of the P-polarized component returns in the direction of the light source, resulting in the reduction of the availability of light. In this embodiment 2, the reduction thereof caused in the embodiment 1 is improved.

FIG. 8 is a schematic side view for explaining a process that the read light turns to a projected light in the embodiment 2, wherein the G-color light together with the G-holographic lens and the G-electrode is exemplarily shown.

In FIG. 8, when the read light impinges on the G-holographic lens 3ge, the S-polarized component thereof is mainly diffracted thereby, and the S-polarized component impinges approximately at a center portion on the G-electrode 13g located on the optical axis of the G-holographic lens 3ge, and is reflected thereby to impinge again on the G-holographic lens 13g. On its way between the G-holographic lens 3ge and the G-electrode 13g, the S-polarized component undergoes a modulation by the light modulation layer 16 and turns into a S-polarized component corresponding to a degree of the modulation. In this case, there are two incident point, a first incident point on the top surface of the G-holographic lens 3ge where the read light impinges downwardly and a second incident point on the bottom surface of the G-holographic lens 3ge where the modulated P-polarized component impinges again upwardly. These incident points hold a symmetric relation with respect to the optical axis of the G-electrode 13ge, because generally, an incident light and a reflected light is symmetrical to a normal line of a face of an object. And an incident direction of the P-polarized light impinging again on the second incident point accords to a diffraction direction of the S-polarized component spectrally diffracted by the G-holographic lens and advancing to the center portion on the G-electrode 13g.

As mentioned in the embodiment 1, the G-holographic lens 3ge diffracts the S-polarized component of the read light at a diffraction efficiency of nearly 100%, and the P-polarized component thereof at about 20% under the previously discussed "optimum condition".

Further, the modulated light impinging again on the holographic lens 3ge is the P-polarized component developed corresponding to a degree of modulation, and this component is the same polarization as the P-polarized component of the read light that the G-holographic lens 3ge diffracts partially.

And the above "optimum condition" still applied the modulated upwordly P-polarized components.

As a result, an about 20% of the modulated P-polarized light returns to the light source (not shown), resulting in a loss of about 20% of the P-polarized component to be projected on the screen.

This is true to the R, B-holographic lenses 3re, 3be, resulting in a reduction of availability efficient of light.

Figure 9:
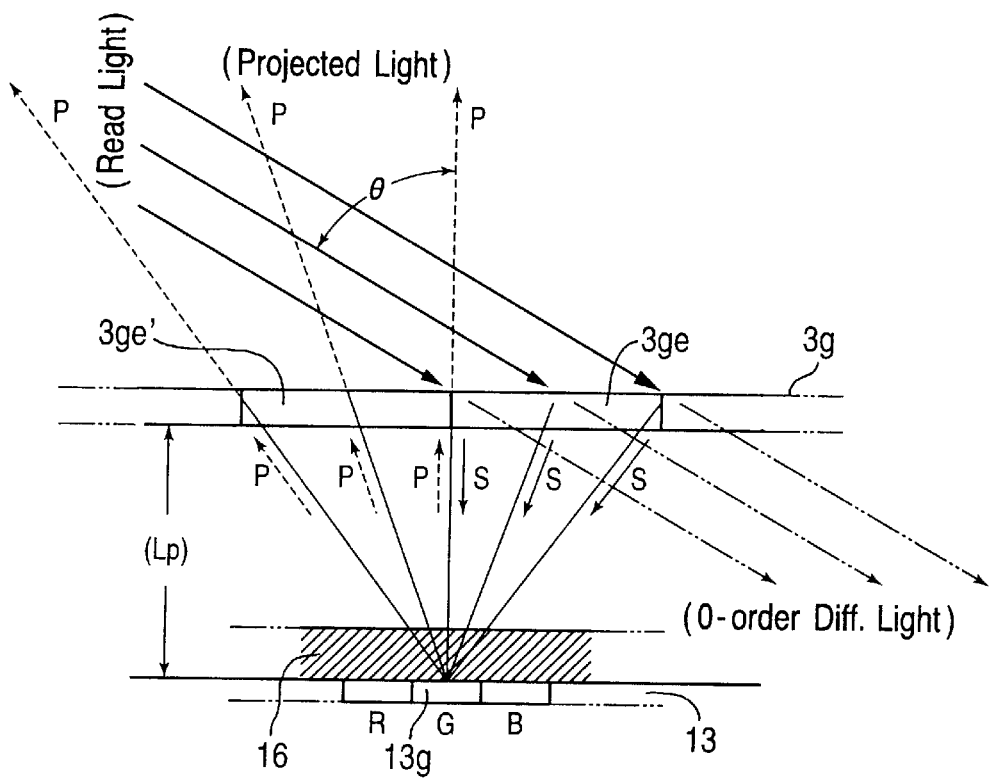
FIG. 9 is a schematic side view for exemplarily explaining a positional relation between a G-holographic lens and a G-electrode in an embodiment 2 of the present invention.

In this embodiment 2, as a countermeasure, a location of the color filter 3 relative to the picture element electrode layer 13 is arranged in such a manner that a center of each of the R, G, B-electrodes 13r, 13g, 13b disposed corresponding to the R, G, B-holographic lenses 3re, 3ge, 3be is displaced at a predetermined distance in a plan view as shown in FIG. 9.

FIG. 9 is a schematic side view for exemplarily explaining a positional relation between a G-holographic lens and a G-electrode in the embodiment 2 of the present invention.

As shown in FIG. 9, a center position of the G-holographic lens 3ge is displaced at a distance of ½ width of the G-holographic lens 3ge from a center position of the G-electrode 13g corresponding to the G-holographic lens 3ge.

And, the read light impinging thereon at an incident angle θ is spectrally diffracted by the G-holographic lens 3ge and is converged on the center portion of the G-electrode 13g.

Thus, a convergent bundle of rays impinges on the center portion of the G-electrode 13g by being declined to the surface thereof, not vertically, as shown with real lines, and a divergent bundle of rays reflected by the center portion thereof impinges on an adjacent G-holographic lens 3ge', thus the relationship between the divergent and convergent convergent bundles of rays is symmetrical with respect to the optical axis of the G-holographic lens 3ge.

Accordingly, in this embodiment, the divergent bundle of rays impinging on the adjacent G-holographic lens 3ge' is less subjected to diffraction caused by the adjacent G-holographic lens 3ge'. In other words, the incident angle of the divergent bundle of rays does not meet "the optimum diffraction condition" of the adjacent G-holographic lens 3ge'. Thus, all the divergent bundle of rays practically passes through the adjacent G-holographic lens 3ge' without being much diffracted.

In this embodiment, as a center of each of the R, B-electrodes 13r, 13b disposed corresponding to the R, B-holographic lenses 3re, 3be is also displaced in the same manner as mentioned above, all the modulated P-polarized component are available to be projected.

Thus, the color image display apparatus of the embodiment 2 according to the present invention enables to increase an availability efficiency of read light of about 20% compared with that of the embodiment 2 shown in FIG. 8.

Figure 10:
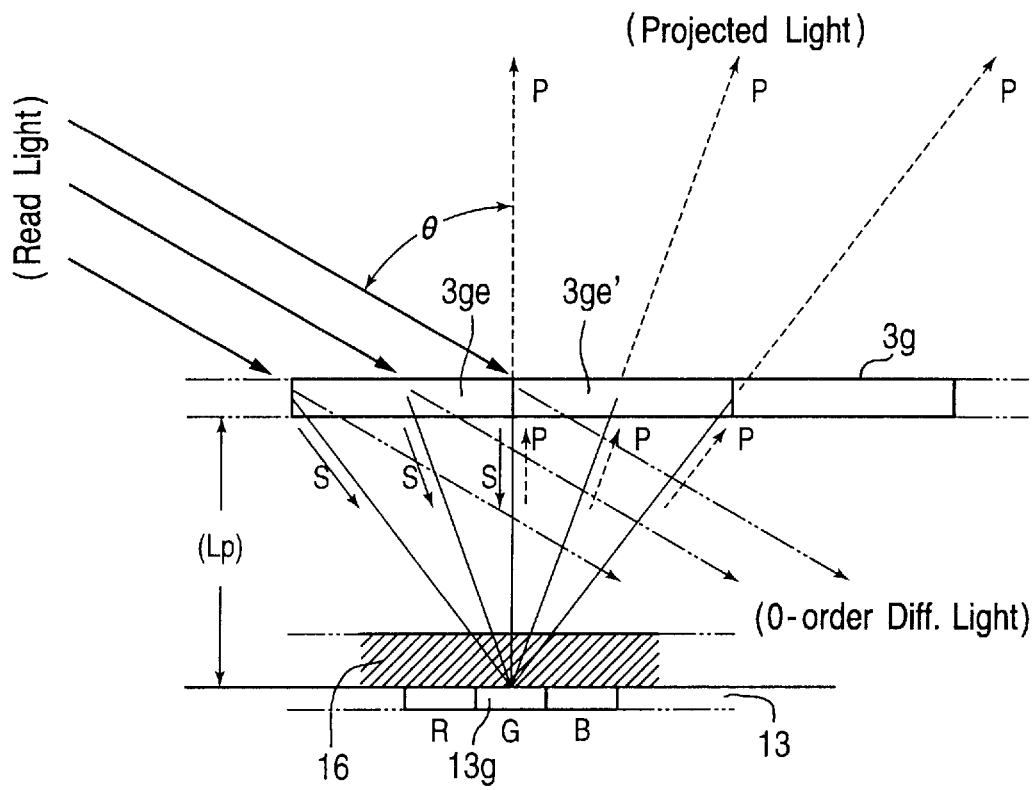
FIG. 10 is a schematic side view of a variation of the embodiment 2 shown in FIG. 9.

A variation of the embodiment 2 is shown in FIG. 10, wherein the divergent bundle of rays impinges on an opposite adjacent G-holographic lens 3ge'.

FIG. 10 is a schematic side view of a variation of the embodiment 2 shown in FIG. 9.

In this construction, the same effect as that of the embodiment 1 can be obtained.

In these embodiments, the displacement distance from a center of each of the R, G, B lenses 3re, 3ge, 3be, to a corresponding center of each of the R, G, B-electrodes 13r, 13g, 13b is made to be 0.5 of a width of the lens, however, it is possible to make the displace distance to be within 0.25 to 0.5 of the width of the lens.

Further, in these embodiment the S-polarized component of the read light is mainly diffracted by the color filter 3, however, it is possible to diffract the P-polarized component thereof on the basis of this principle.

[Embodiment 3]

In an overall construction of each of the color image display apparatuses of the embodiments 1 and 2, each comprises a light source for generating the read light, an incident optical system for causing the read light to impinge on a spatial light modulation section and a projection optical system for projecting the modulated light from the spatial light modulation section. And the projection optical system needs no polarization beam splitter and employs a projection lens having a small image circle, which enables an image projection by employing a high precision projection lens.

However, when the P-polarized component developed by the modulation is used as the projected light, the S-polarized component developed by a degree of the modulation and the S-polarized component developed by the modulation of the P-polarized component that the read light is diffracted by the color filter 3, pass through the color filter 3 as 0-order diffraction light and is outputted in the same direction as that of the P-polarized component developed by the modulation, resulting in a reduction of the contrast ratio of the color image.

Figure 11:
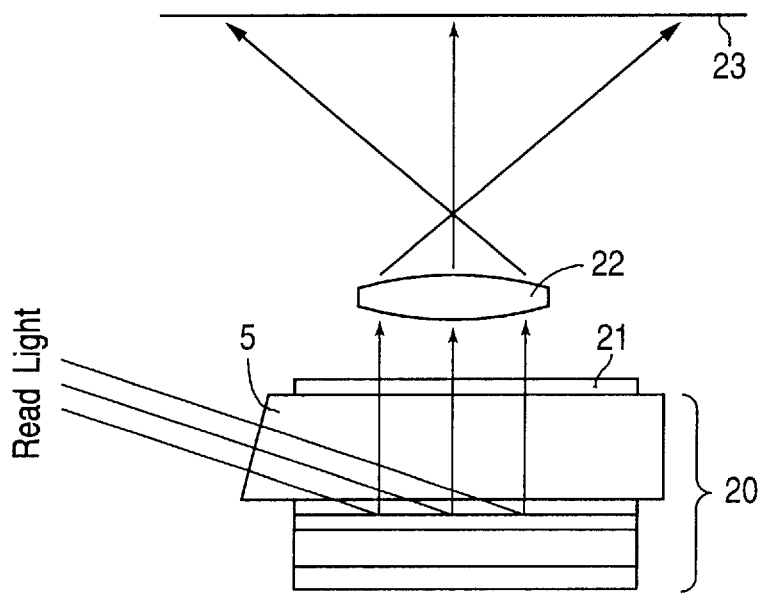
FIG. 11 is a schematic side view showing a projection type color image display apparatus employing a polarizing plate in an embodiment 3 of the present invention.

In this embodiment 3, as a countermeasure, a polarizing plate 21 is provided on an output surface of the coupling prism 5 for allowing only the P-polarized component to pass through the polarizing plate 21 and preventing the S-polarized light from being outputted therefrom as shown in FIG. 11.

FIG. 11 is a schematic side view showing a projection type color image display apparatus employing a polarizing plate in the embodiment 3 of the present invention.

Thereby, the P-polarized light is only projected by a projection lens 22 on a screen 23.

Figure 12:
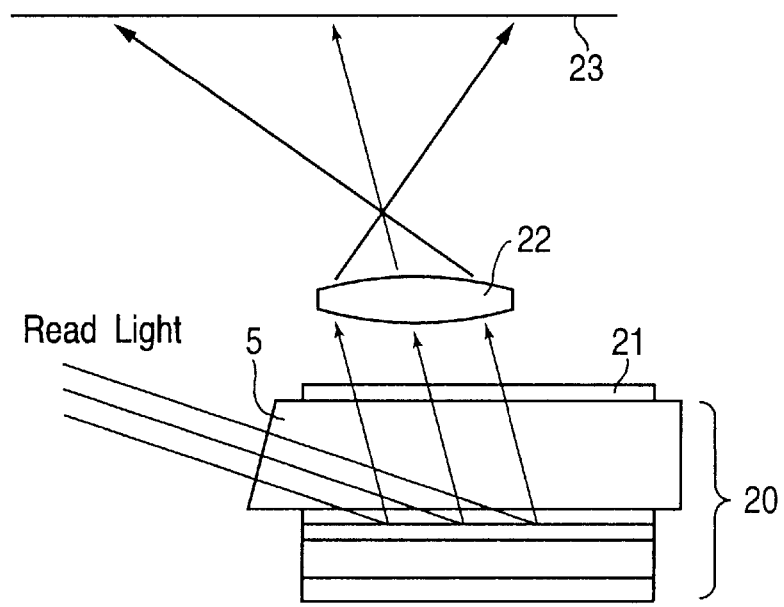
FIG. 12 is a schematic side view of a variation of the embodiment 3 shown in FIG. 11.

Further, as explained in the embodiment 2, the projection angle of the P-polarized component is slightly declined, however, it is possible to the P-polarized component to be parallel to the P-polarized light by controlling the projection lens 22 as shown in FIG. 12.

FIG. 12 is a schematic side view of a variation of the embodiment 3 shown in FIG. 11.

Figure 13:
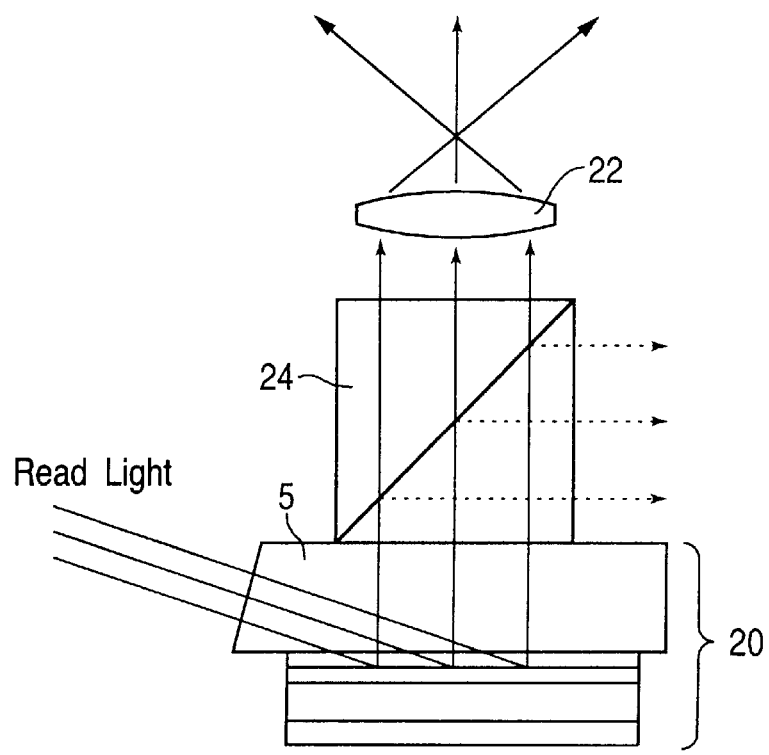
FIG. 13 is a schematic side view of another variation of the embodiment 3 shown in FIG. 12.

Further, it is possible to employ a polarization beam splitter 24 instead of the polarizing plate 22 as shown in FIG. 13.

FIG. 13 is a schematic side view of another variation of the embodiment 3 shown in FIG. 12.

In the above embodiments, the countermeasures are taken in the projection optical system, however, it is possible to take the same countermeasure in the input optical system by providing the polarizing plate or the polarization beam splitter in an incident optical path of the spatial light modulation section 20. Thereby, the read light can be preliminarily restricted to be the S-polarized component only, resulting in the same effect as mentioned above.

Further, in these embodiments the modulated P-polarized component of the read light is mainly used as the projection light, however, it is possible to use the S-polarized component thereof as the projection light, wherein the polarization character of the polarizing plate or the polarization beam splitter is reversed.

[Embodiment 4]

As shown in the embodiment 1, each of the characteristics of the diffraction efficiency of the R, G, B-holographic lens array layer 3r, 3g, 3b corresponding to the wavelength of the incident light is respectively shown in FIGS. 5 to 7.

However, these characteristics are applied to a case where the incident light is completely parallel.

When the incident light is not a completely parallel one, each of the characteristics becomes broader compared with those shown in FIG. 5 to 7, resulting in an overlap in a boundary region of each color. This develops a degradation of color purity of a reproduced image.

As a countermeasure, it is effective to provide a filter for eliminating the light component corresponding to the above wavelength region.

Figure 14:
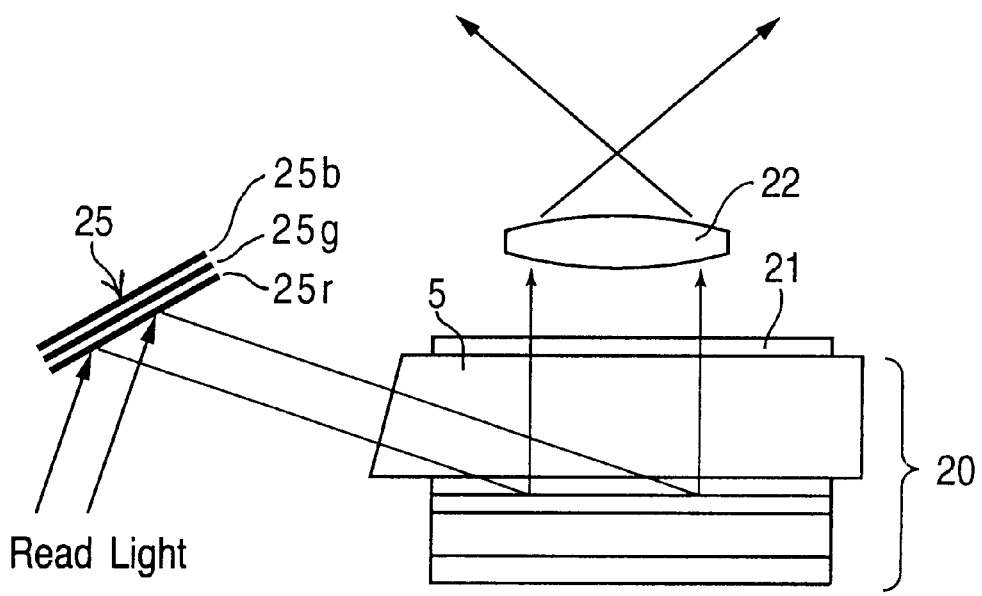
FIG. 14 is a schematic side view of an improved color image display apparatus in the embodiment 4 of the present invention, wherein a dichroic mirror is employed.

This specific embodiment is shown in FIG. 14.

FIG. 14 is a schematic side view of an improved color image display apparatus in the embodiment 4 of the present invention, wherein a dichroic mirror is employed.

In this embodiment 4, a dichroic mirror unit 25 is provided as a filtering device between the light source (not shown) and the coupling prism 5. The dichroic mirror unit 25 is composed of R, G, B-dichroic mirrors 25r, 25g, 25b stacked in parallel each other, each for reflecting a light component corresponding to a color wavelength region at an angle of 45° and causing it to impinge on the incident surface of the coupling prism 5, by transmitting other light components except for the light component corresponding to the color wavelength region. The R, G, B-dichroic mirrors 25r, 25g, 25b may be multiply formed on a glass substrate by means of evaporation coating of dielectric materials.

Figure 15:
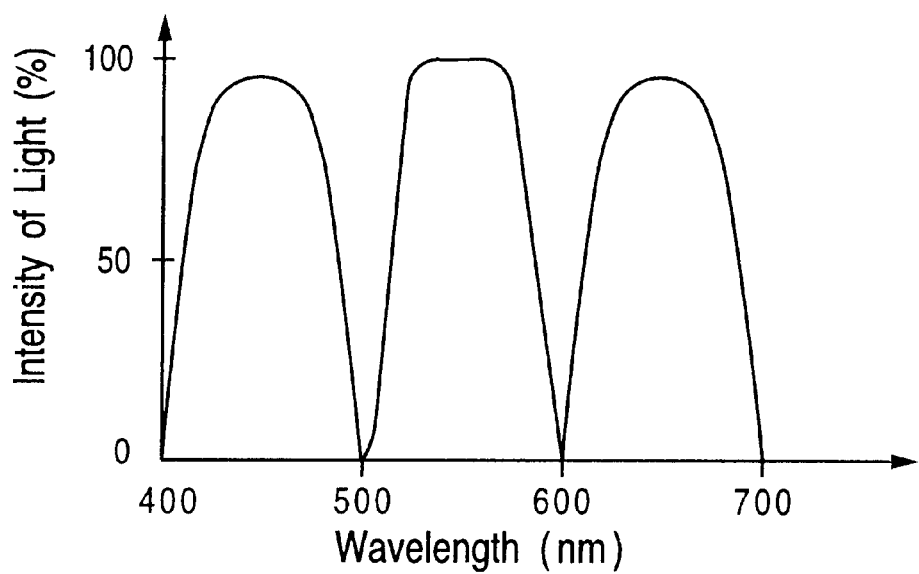
FIG. 15 is a graph of an example of a spectrum of a light beam restricted to respective color wavelength regions by the R, G, B-dichroic mirrors shown in FIG. 14.

FIG. 15 is a graph of an example of a spectrum of a light beam restricted to respective color wavelength regions by the R, G, B-dichroic mirrors shown in FIG. 14.

As seen from FIG. 15, a light beam is completely separated corresponding to respective color wavelength regions, R, G, B. This light beam enables to prevent the degradation of color purity even when the incident light is not complete parallel one.

As well known, characteristics of the R, G, B-dichroic mirrors 25r, 25g, 25b are adjustable by changing the kind of the dielectric material, and thickness and a number of each of the layers. Thus, the dichroic mirror unit 25 can be optimized taking account of a wavelength distribution of the light beam generated by the light source, the wavelength-diffraction efficiency characteristic of the color filter 3 and a desired color of the reproduced image. Instead of the reflection type dichroic mirror unit 25, a transmission type dichroic mirror (not shown) may be used.

When a sever color separation is needed in the color filter 3 of the spatial light modulation section 20 in connection with the color purity, a slight increment of a diffraction efficiency causes a problem if it is developed in other wavelength regions than the intended color wavelength region in each of the R, G, B-holographic lens array layers 3r, 3g, 3b.

Specifically, as shown in FIGS. 5 to 7, the maximum diffraction efficiency is decreased as the wavelength deviates from the optimized wavelength of the maximum diffraction efficiency. As the wavelength further deviates therefrom, the diffraction efficiency fluctuates like waving. This waving is referred to as a side-lobe.

It is generally known that there is a relation between an angle of diffraction caused by a hologram and an incident angle as represented by a formula (1).

$$\sin\alpha + \sin\beta = \lambda/\rho \quad (1)$$

α: an incident angle
β: an angle of diffraction
λ: a wavelength
ρ: a period of diffraction grating In the formula (1), when both the incident angle α and the period ρ of the diffraction grating are fixed value, the sine of the angle of diffraction β and the wavelength λ has a linear relationship.

Thus, each of the light beams diffracted by the holographic lens array layer 3r, 3g, 3b has a different diffraction angle depending on a wavelength to be used. By utilizing this characteristic, it is possible to cause a color light beam to converge on a corresponding color electrode and other color light beams such as the side-lobe to converge on other corresponding electrodes, resulting in an excellent color purity of the reproduced image.

Figure 16:
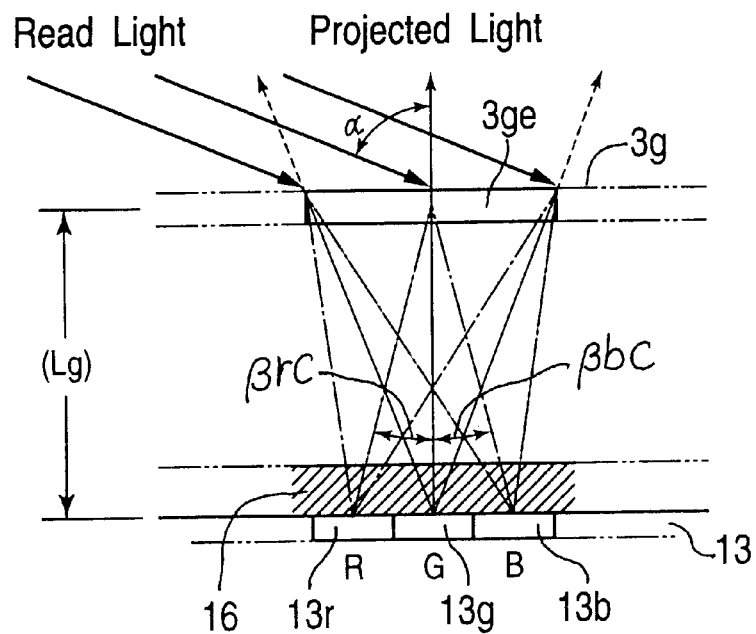
FIG. 16 is a schematic side view for explaining a diffraction of an exemplary the G-holographic lens in the embodiment 4, wherein a light beam diffractively converging on the G-holographic lens 3ge of the G-holographic lens array layer 3g is discussed.

Next, a detailed description is given of an embodiment referring to FIG. 16.

FIG. 16 is a schematic side view for explaining a diffraction of an exemplary G-holographic lens in the embodiment 4, wherein a light beam diffractively converging on the G-holographic lens 3ge of the G-holographic lens array layer 3g is discussed.

In FIG. 16, a vertical distance between the G-holographic lens array layer 3g and each of the G-electrodes 13g of the picture element electrode layer 13 is determined as "Lg" which satisfies formulas represented by (2) and (3) or nearly does.

$$Lg = Pc/\tan|\beta bc| \quad (2)$$

$$Lg = Pc/\tan|\beta rc| \quad (3)$$

Lg: a vertical distance between the G-holographic lens array layer 3g and each of the G-electrodes 13g.
Pc: a pitch of picture element electrodes.
βbc: an angle of diffraction of a center wavelength in the B-wavelength region.
βrc: an angle of diffraction of a center wavelength in the R-wavelength region.

Incidentally, an angle of diffraction "βgc" of a center wavelength within the G-wavelength region is zero.

In other words, a focal length of each of the G-holographic lenses 3ge is set up to accord to the "Lg".

In the same manner as mentioned above, it is possible to determine distances between other R, B-holographic lens array layers 3r, 3b and the picture element electrode 13 color.

However, the color filter 3 used in the embodiment 1 is constructed as a three layer structure corresponding to the three colors (primaries). Thus, the distance therebetween is basically determined based on one of the three colors.

As a result, it is possible to realize a high color reproducibility by setting up a focal length of each of the R, G, B-holographic lenses 3re, 3ge, 37be to approximately accord to the distance determined within an allowable range.

[Embodiment 5]

In each of the embodiments of the present invention, the reading light 10 impinges on the color filter 3 of the spatial light modulation layer at a large incident angle ranging from not less than 60° to less than 90° to the normal line of the color filter 3. Then, it is difficult to uniformly illuminate all over the surface of the color filter 3 because a distance from the light source to a left side of the color filter 3 and a distance from the light source to a right side thereof are different from each other. This may cause a shading problem on the screen when it is applied to the color image display apparatus.

For this shading problem, a power increase of the light source is not practical as it causes a size of the light source to increase, so that it becomes difficult to make a beam of the read light sharp enough to be focused on the respective color electrodes.

Figure 17:
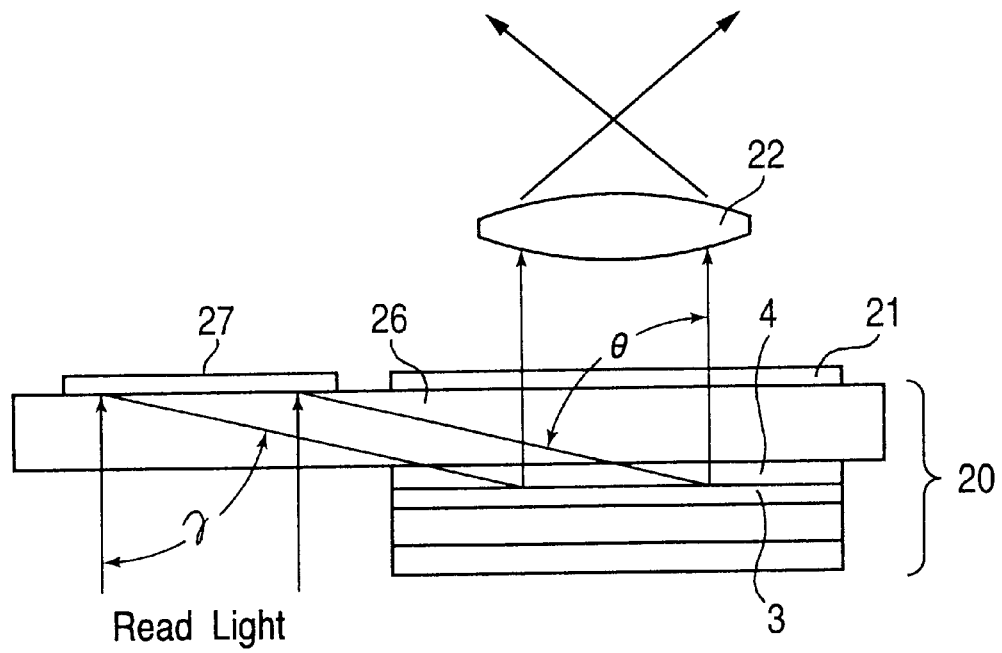
FIG. 17 is a schematic side view showing an improvement in an embodiment 5 by employing a polarization hologram.

Next, a description is given of a method for eliminating the above problem by causing the both distances to be equal to each other referring to FIG. 17.

FIG. 17 is a schematic side view showing an improvement in an embodiment 5 by employing a polarization hologram.

In the embodiment 5, a polarization hologram 27 is provided on a top surface of a flat glass plate 26 closely contacted with the color filter 3 or the glass substrate 4 instead of the coupling prism 5 shown in FIG. 1.

The polarization hologram 27 is constructed so that the read light vertically impinging on a bottom surface of the flat glass plate 26 is reflectively diffracted by the polarization hologram 27 at an angle γ, and the diffracted light impinges on the surface of the color filter 3 through the flat glass plate 26.

In this case, the optical distance of the incident light impinging on the color filter 3 from the light source becomes approximately equal at any position of the color filter 3 because the incident light is diffractively bent by the polarization hologram 27, resulting in a rational elimination of the shading problem.

Further, when the wavelength of the read light is changed, the angle of diffraction γ is changed correspondingly with the wavelength thereof. However, when the angle of diffraction γ caused by the polarization hologram 27 is made to be equal to the incident angle θ to the normal line of the color filter 3, the incident angle θ changes corresponding to the changed angle of diffraction γ. As a result, it is possible to maintain a constant angle β (not shown) of diffraction caused by the color filter 3. In other words, this effectively compensates the change of the angle β of diffraction due to the light beam having a broad bandwidth.

As mentioned in the embodiment 4, the distance Lg between the color filter 3 and the picture element electrode layer 13 is determined based on the variation of the angle of diffraction corresponding to the wavelength region (formula (1)). When this distance is too small, there arise a problem that the assembly is very difficult because the thin glass layer 2 becomes very thin. Further, NA (numerical aperture) of each of the R, G, B-holographic lenses 3re, 3ge, 3be becomes larger, so that the divergence of the light beam reflected by each of the R, G, B-electrodes 13r, 13g, 13b becomes larger, resulting in a difficulty to project all the light beam on the screen. This may cause a reduction of an efficiency of availability of the light beam.

When the reverse effect of the side-lobe to the color producibility in connection with the diffraction efficiency of the R, G, B-holographic lenses 3re, 3ge, 3be is negligibly small, the dependency of the angle of diffraction on the wavelength can be compensated by using this polarization hologram 27. Thus, upon determining the distance between the color filter 3 and the picture element electrode layer 13, a degree of freedom can be maintained and the NA of each of the R, G, B-holographic lenses 3re, 3ge, 3be can be reduced, resulting in a high availability factor of the light. Further, when the NA of the each of the R, G, B-holographic lenses 3re, 3ge, 3be is reduced, it is possible to prevent the degradation of the contrast ratio and the availability efficiency caused by the the dependency of the angle of diffraction on the wavelength in the case shown in FIG. 13 where the polarization beam splitter 24 is provided in the projection optical system.

In this embodiment, a reflection type polarization hologram is used as the polarization hologram 27, however, a transmission type one is also usable in place of the polarization hologram 2 in FIG. 17. In that case, the read light from the light source (not shown) placed above the flat glass plate 26 directly impinges on the transmission type one, and the diffracted light thereby is introduced to the color filter 3 through the plane glass plate 26. Thereby, it is possible to compensate the dependency on the wavelength as well.

However, in the transmission type hologram having a large bend angle, the dependency of the diffraction efficiency on the wavelength is comparatively larger. Thus, as the wavelength of the light beam deviates from a center of the corresponding wavelength, the diffraction efficiency is decreased correspondingly with the deviation.

Accordingly, the transmission type one is preferably applied to an apparatus capable of obtaining an outputted light beam having an enough intensity with a narrow bandwidth from the light source 28. On the contrary, the reflection type one is preferably applied to a case where a xenon lamp, a metal halogen lamp or a halogen lamp is used as the light source 17, because the reflection type one has a higher diffraction efficiency in a broader bandwidth.

[Embodiment 6]

In this embodiment, the description is given of improvements of the color image display apparatus and variations thereof, wherein the basic construction of the incident optical system shown in the embodiment 5 and the bandwidth restriction devices shown in the embodiment 4 are combined.

Figure 18:
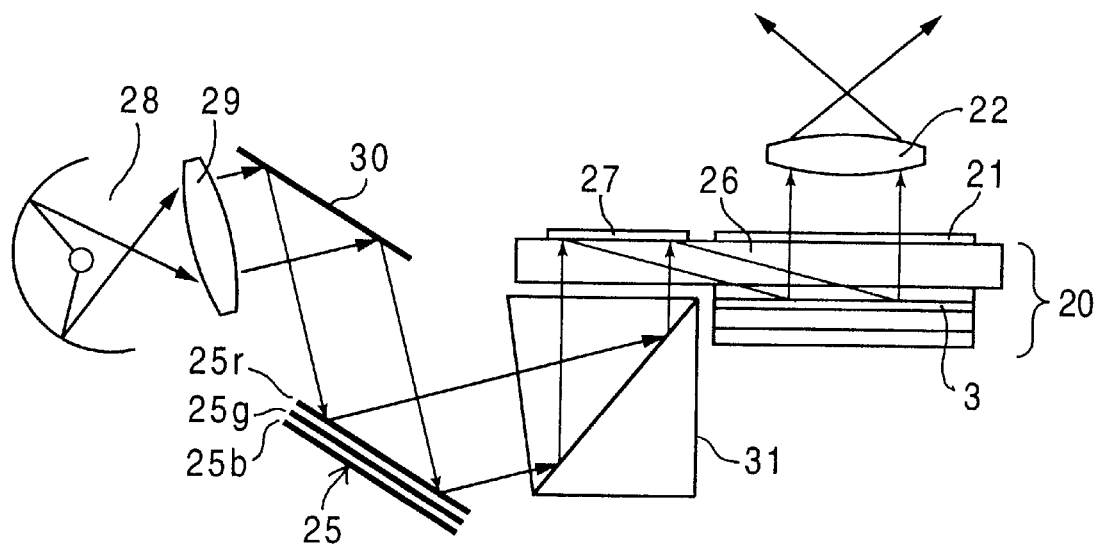
FIG. 18 is a schematic side view showing an improvement in an embodiment 6 of the color image display apparatus in the present invention.

First, as an overall construction, an example is shown in FIG. 18.

FIG. 18 is a schematic side view showing an improvement in an embodiment 6 of the color image display apparatus in the present invention.

In FIG. 18, the polarization hologram 27 is provided on the top surface of the flat glass plate 26 closely contacted with the color filter 3 or the glass plate 4 of the spatial light modulation section 20 as mentioned in the embodiment 5, wherein the read light impinges on the polarization hologram 27.

In this embodiment, the white light generated from the light source 28 is made to be a parallel bundle of rays by a collimator lens 29 and is reflected by a mirror 30 so as to impinge on the dichroic mirrors 25r, 25g, 25b for generating 3-colors. Upon reflection by the dichroic mirrors 25r, 25g, 25b, the generated each of 3-color lights is band-limited to have the spectrum characteristic shown in FIG. 15, thereafter, each of them impinges on the polarization beam splitter 31. Thereby, the S-polarized components are separated, and impinges on the polarization hologram 27 through the flat glass plate 26.

According to this embodiment, in the incident optical system, "the read light from the light source is made to be parallel bundle of rays", "the bandwidth of each color component is restricted" and is "characterized to a specific polarized component". In addition, the optical distance between the light source 28 and the color filter of the spatial light modulation section 20 is made equal with respect to any position of the color filter 3. This allows to spectrally diffract and to modulate the light effectively, resulting in an high availability efficiency of the light, and an excellent color image having a high contrast ratio and a high color purity.

Incidentally, the angle of diffraction caused by the polarization hologram 27 depends on the wavelength of the incident light. Thus, when the distance between the polarization hologram 27 and the color filter 3 of the spatial light modulation section 20 is too large, the diffracted light beam diverges largely due to the variation of the angle of diffraction caused by the difference of the wavelength of the incident light beam. This causes a problem that the read light can not be effectively irradiated on the color filter 3.

This problem has been eliminated by following measures in the present invention.

Figure 19:
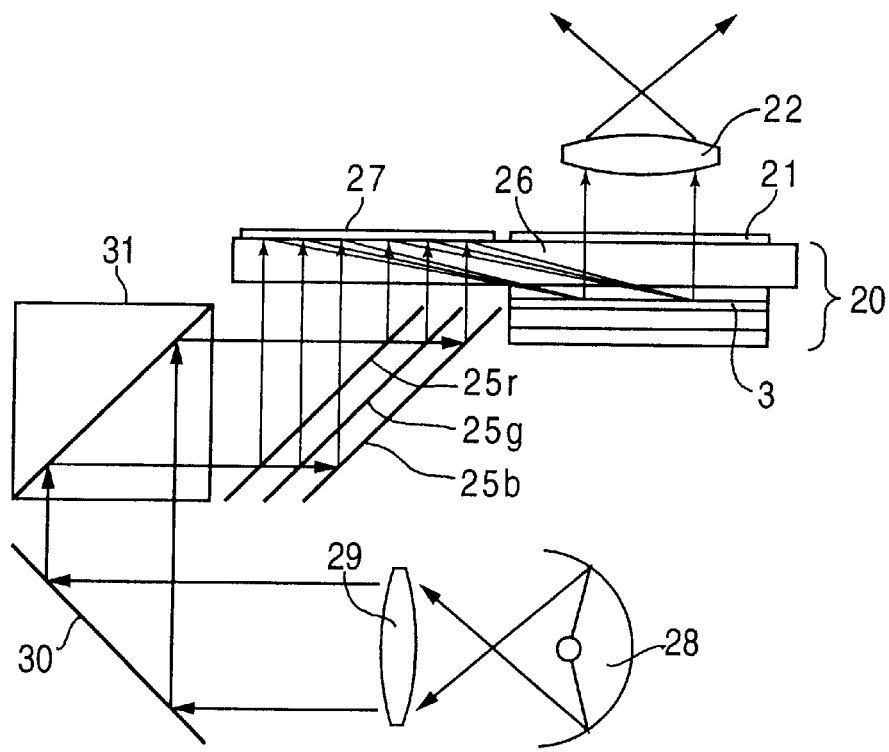
FIG. 19 is a schematic side view showing an exemplary improvement of the color image display apparatus in the embodiment 6 in the present invention.

FIG. 19 is a schematic side view showing an exemplary improvement of the color image display apparatus in the embodiment 6 in the present invention.

(a) Taking account of the dependency of the angle of diffraction on the wavelength in the polarization hologram 27, a distance between the dichroic mirrors 25r, 25g, 25b is enlarged as shown in FIG. 19, Thereby, each of light beams in the R-region, the G-region and the B-region is effectively irradiated on the color filter 3.

Figure 20:
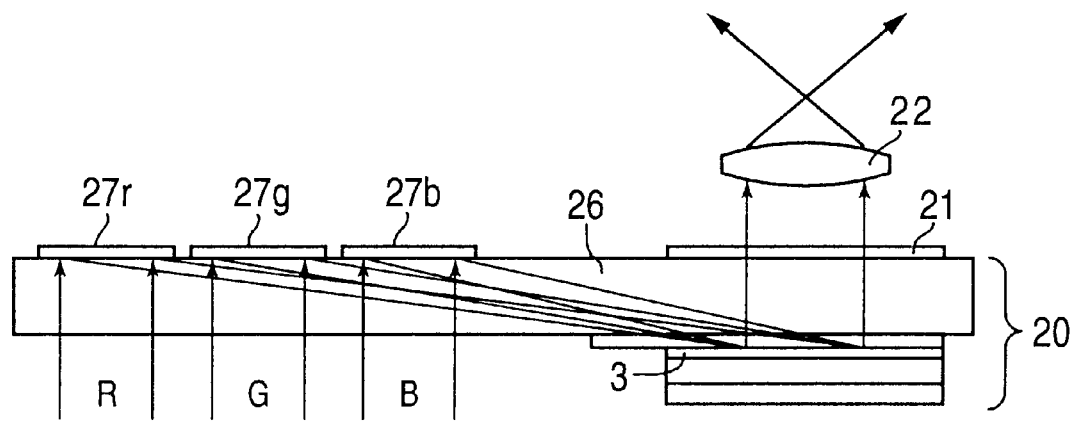
FIG. 20 is a schematic side view showing another exemplary improvement of the color image display apparatus in the embodiment 6 in the present invention.

FIG. 20 is a schematic side view showing another exemplary improvement of the color image display apparatus in the embodiment 6 in the present invention.

(b) R, G, B-region polarization holograms 27r, 27g, 27b are individually produced to have respective bandwidths, and is closely provided on the flat glass plate 26 being laterally separated from each other as shown in FIG. 20. The read light from the light source (not shown) is preliminarily separated into 3-color lights corresponding to R, G, B-colors, and they impinge respectively on the R, G, B-region polarization holograms 27r, 27g, 27g through the flat glass plate 26. The 3-color lights diffracted by the R, G, G-region polarization holograms 27r, 27g, 27b impinge on the color filter 3 at different angles of diffraction depending on the color.

Figure 21:
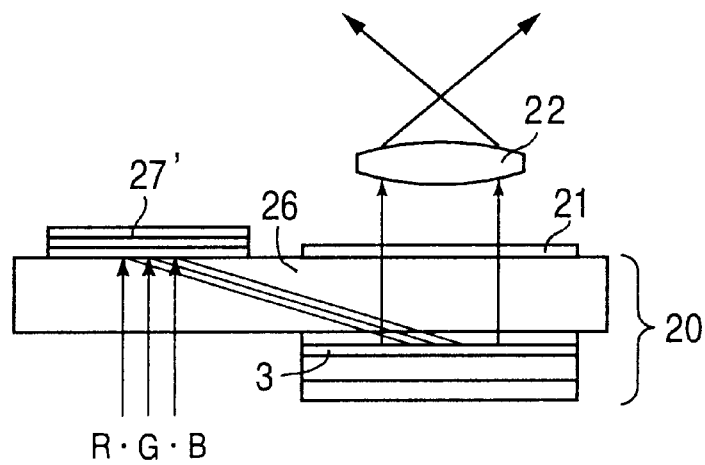
FIG. 21 is a schematic side view showing other exemplary improvement of the color image display apparatus in the embodiment 6 in in the present invention.

FIG. 21 is a schematic side view showing other exemplary improvement of the color image display apparatus in the embodiment 6 in in the present invention.

(c) Polarization hologram 27' is formed as a laminated structure of R, G, B-region polarization holograms (not shown) as shown in FIG. 21. The read light impinges on the polarization hologram 27' so that each of 3-color lights thereof with respect to a center wavelength thereof is diffracted to impinge on the color filter 3 at the same angle of diffraction.

Figure 22:
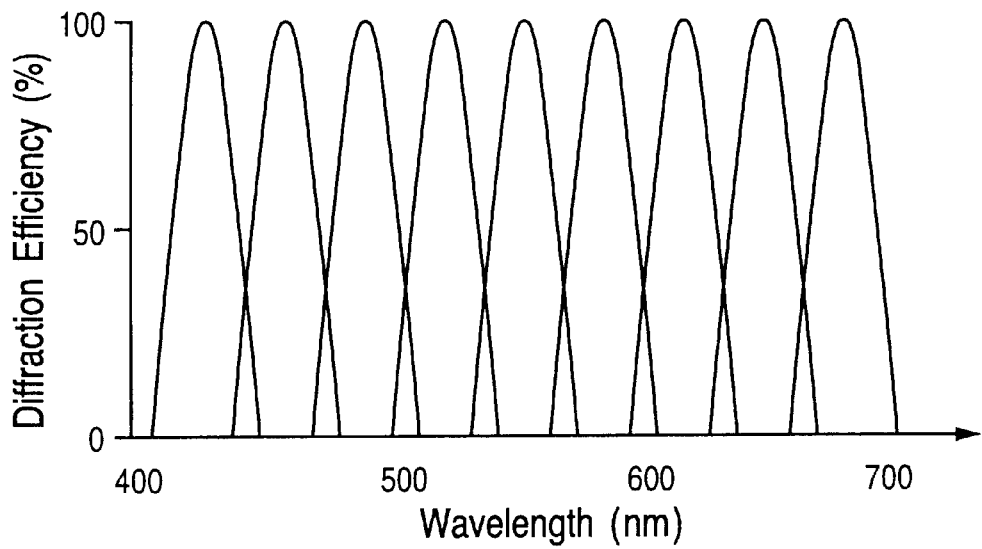
FIG. 22 is a graph showing a characteristic of a polarization hologram having a laminated structure of a large number of holograms in the embodiment 6.

FIG. 22 is a graph showing a characteristic of a polarization hologram having a laminated structure of a large number of holograms in the embodiment 6.

(d) When the Δ (an amount of modulation of refractive index) of the polarization hologram 27' is small, the bandwidth is narrower at a incident angle of 0°. Thus, a laminated structure (not shown) of a large number of polarization holograms is available in the polarization hologram 27', wherein one color region is covered by a plurality of polarization hologram as shown in FIG. 22.

In this case, each diffracted angle at which the diffraction efficiency shows a peak at each bandwidth is preliminarily set up to be identical.

Further, the surface of the polarizing hologram 27' is not necessary to be parallel to the color filter 3.

It is possible to incline the surface of the polarization hologram 27' to the color filter 3 or to cause the incident light beam to be slant to the normal line of the polarization hologram 27' so that the bend angle becomes smaller. This enables to widen a bandwidth for a high diffraction efficiency of a light beam, resulting in an effective irradiation of the color filter 3.

Figure 23:
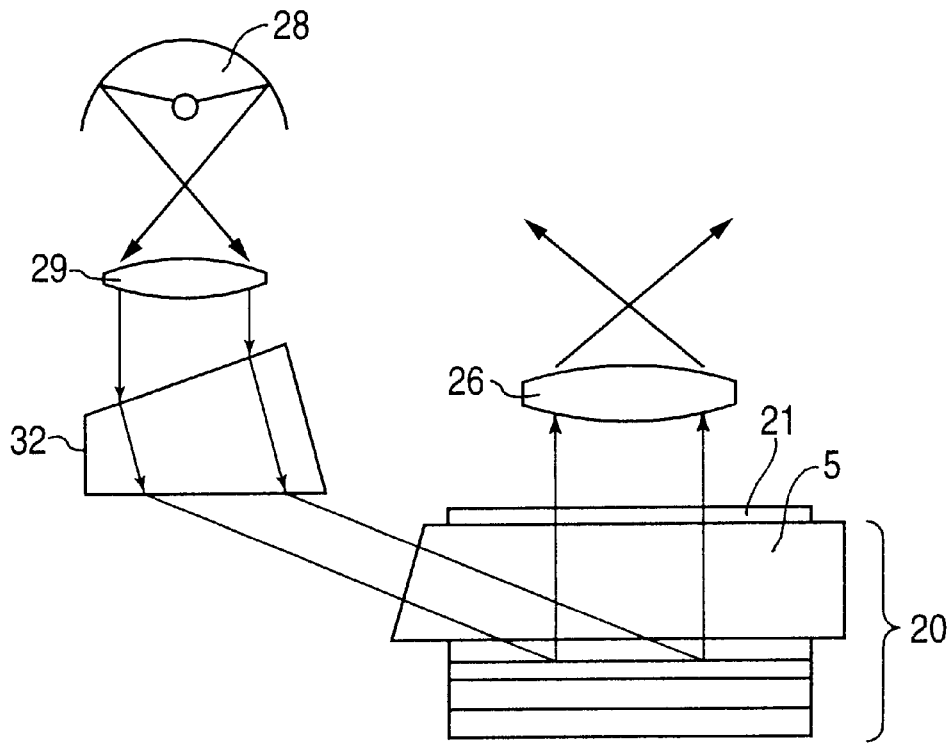
FIG. 23 is a schematic side view showing other exemplary improvement of the color image display apparatus in the embodiment 6 in in the present invention.

FIG. 23 is a schematic side view showing other exemplary improvement of the color image display apparatus in the embodiment 6 in in the present invention.

As other exemplary improvement, it is possible to employ a deflection prism 32 in the incident optical system as shown in FIG. 23.

The read light generated by the light source 28 is made to be a parallel light having a rather broad bundle of rays by the collimator lens 29. The parallel light impinges on a deflection prism 32 and is transformed into a light beam having a narrow width capable of impinging on the surface of the coupling prism 5 by being refracted at both an incident surface and an output surface of the polarization prism 32.

In this embodiment, the width of the incident light is reduced by the deflection prism 32, and the optical distance between the color filter 3 and the light source 28 is unified with respect to any position of the color filter 3, resulting in an improvement of the shading in the reproduced color image.

Incidentally, the angle of refraction caused by the deflection prism 32 is varied depending on the wavelength, however, an amount of the variation thereof is smaller compared with that of the polarization hologram 27. Thus, it is impossible to completely compensate the divergence of the angle of diffraction caused by the wavelength.

[Embodiment 7]

In this embodiment, the read light is separated into the S-polarized component and the P-polarized component. Thus separated S and P-polarized components are individually modulated according to respective colors and luminance signals by using two kinds of spatial light modulation sections. The modulated S and P-polarized components are projected as a composite color image on the screen, resulting in an excellent reproduced color image having a high luminance and contrast ratio. The embodiment 7 relates to the color image display apparatus having such function as mentioned above.

Figure 24A:
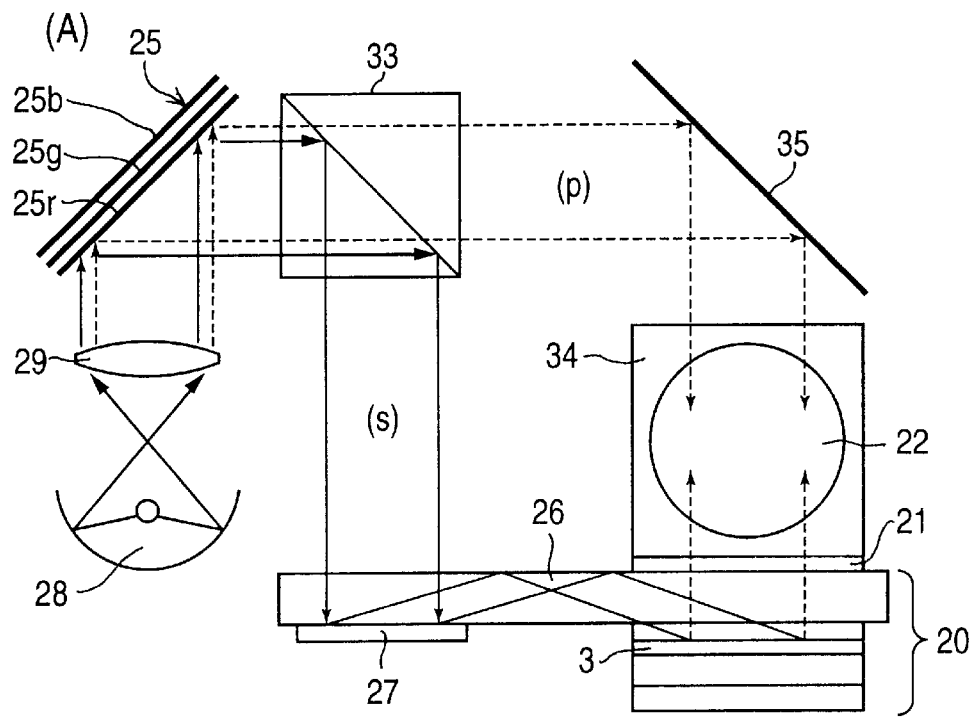
FIG. 24 (A) is a schematic side view showing a color image display apparatus employing two spatial light modulation sections in an embodiment 7 of the present invention.
Figure 24B:
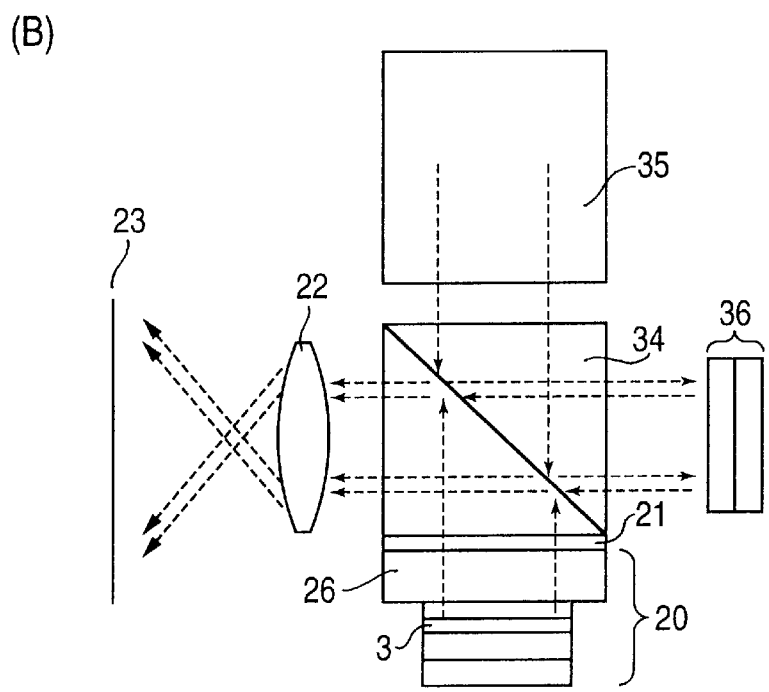

FIG. 24 (A) is a schematic side view showing a color image display apparatus employing two spatial light modulation sections in the embodiment 7 of the present invention, wherein there are mainly shown a polarized component separation system, a modulation system according to the color signal, and a synthesizing system of the modulated polarized components.

FIG. 24 (B) is a schematic back view of the color image display apparatus shown in FIG. 24 (A), wherein there are mainly shown the modulation system responsive to the color and luminance signals, the synthesizing system of the modulated polarized components and a projection optical system.

Referring to FIGS. 24 (A) and (B), in this embodiment, a white light generated from the light source 28 is made to be parallel by a collimator lens 29, and impinges on the dichroic mirrors 25r, 25g, 25b for 3-colors applied to the embodiment 4. Thus, the wavelength regions of R, G, B-color lights are restricted by the dichroic mirrors 25r, 25g, 25b respectively as mentioned in the foregoing.

Further, the reflected R, G, B-color lights thereby impinge on a first polarization beam splitter 33 as a pre-polarizer, and are separated into S-polarized components and P-polarized components.

The S-polarized components impinge on one spatial light modulation section 20 having approximately the same construction as mentioned in the embodiment 5. However, the flat glass plate 26 of the spatial light modulation section 20 is more extended in a side direction thereof compared with that of the embodiment 5 so that the S-polarized components from the first polarization beam splitter 33 can impinge vertically on the polarization hologram 27 closely provided on a bottom of the flat glass plate 26. The S-polarized components are diffracted by the polarization hologram 27 and impinge on the color filter 3 by being reflected once within the flat glass plate 26 therein.

After the S-polarized components are spectrally diffracted by the color filter 3 for respective color components of 3-colors, they are modulated to become P-polarized components corresponding to the color signals at every picture element on the basis of the structure and function of the spatial light modulation section 20 mentioned in the embodiment 1. Then, the modulated P-polarized components developed by the modulation are outputted outside from the flat glass plate 26. In this apparatus, the P-polarized components further impinge on a second polarization beam splitter 34 for synthesizing with other the modulated polarized components as will be explained hereinafter.

Further, non-modulated S-polarized components responsive to a degree of the modulation are blocked by the polarizing plate 21 provided between the flat glass plate 26 and the second polarization beam splitter 34. Thus, only the modulated P-polarized components are inputted to the second polarization beam splitter 34.

On the other hand, the P-polarized components separated by the first polarization beam splitter 33 advance straight and are reflected by a mirror 35 for changing their direction and impinge on the second polarization beam splitter 34 provided on their path for synthesizing the polarized components.

The P-polarized components are inputted to the other spatial light modulation section 36 by the second polarization beam splitter 34 by being reflected by a separation surface thereof, as shown in FIG. 24 (B).

The other spatial light modulation section 36 is basically comprised of a modulation layer (not shown) and a picture element electrode layer (not shown) without the color filter 3, though the one spatial light modulation section 20 has the color filter 3. On the picture element electrode layer of the spatial light modulation section 20, there are disposed a plurality of picture element electrodes (not shown) in such manner that each of the plurality of picture element electrodes corresponds to a group of the R, G, B-electrodes arranged adjacent to each other. And each of the plurality of picture elements electrodes is driven in synchronization with the luminance signal.

Accordingly, the P-polarized components having impinged on the other spatial light modulation section 36 are intensively modulated thereby and inputted again to the second polarization beam splitter 34 as a luminance modulated light.

As a result, on the second polarization beam splitter 34 the color modulated light (P-polarized components) and the luminance modulated light (P-polarized components are inputted. Thus, they are synthesized on an identical optical axis by the polarization separation surface thereof and are projected by the projection lens 22 on the screen as a composite color image.

According to the color image display apparatus in this embodiment, both the S-polarized components and the P-polarized components contained in the read light generated from the light source 28 are utilized to obtain the color modulated light added to the luminance modulated light, and both the color modulated light and the luminance modulated light are synthesized as a single projected light. Thus, this construction together with the feature of the spatial light modulation section 20 employing a color filter 3 having the hologram enables to display a reproduced image having a high contrast and luminance.

In this embodiment, the S-polarized components of the read light impinge on the one spatial light modulation section 20 and the P-polarized components thereof impinge on the other spatial light modulation section 36, however, this relation can be reversed in principle.

In that case, as the color filter 3, one that mainly spectrally diffracts the P-polarized components to converge on the R, G, B-electrodes corresponding to respective colors, is employed. Further, as the polarizing plate 21, one that transmits only the S-polarized components is employed.

In the color image display apparatus of this embodiment 7, the diffracted read light by the polarization hologram 27 is reflected once by the flat glass plate 26 therewith, and impinges on the color filter 3. In this construction, an optical path between the polarization hologram 27 and the color filter 3 may be too long. This may cause a problem of a degradation of irradiation efficiency.

Figure 25A:
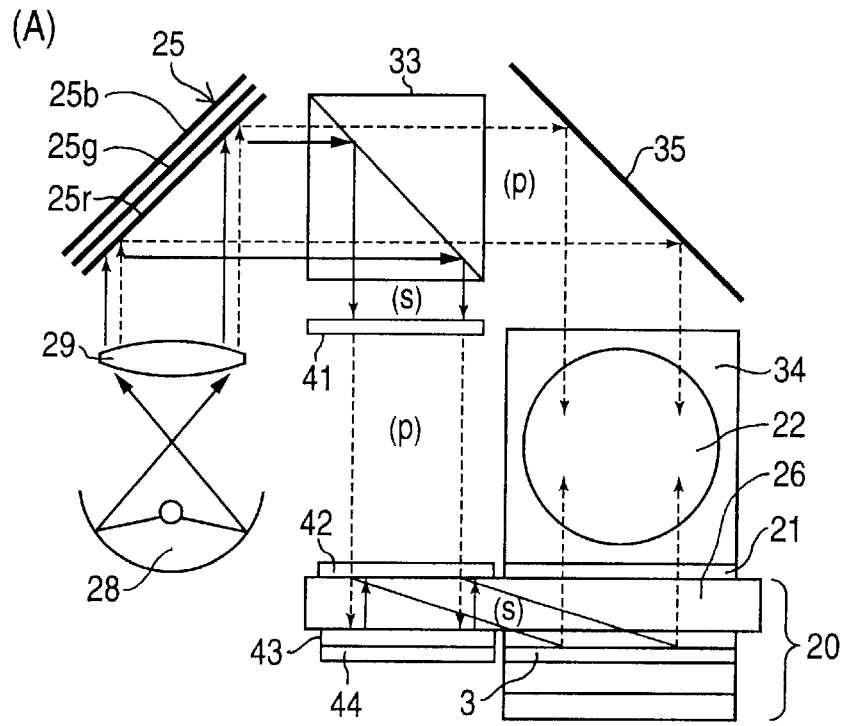
FIG. 25 (A) is a schematic side view of a variation of the color display apparatus shown in FIGS. 24 (A) and 24(B)
Figure 25B:
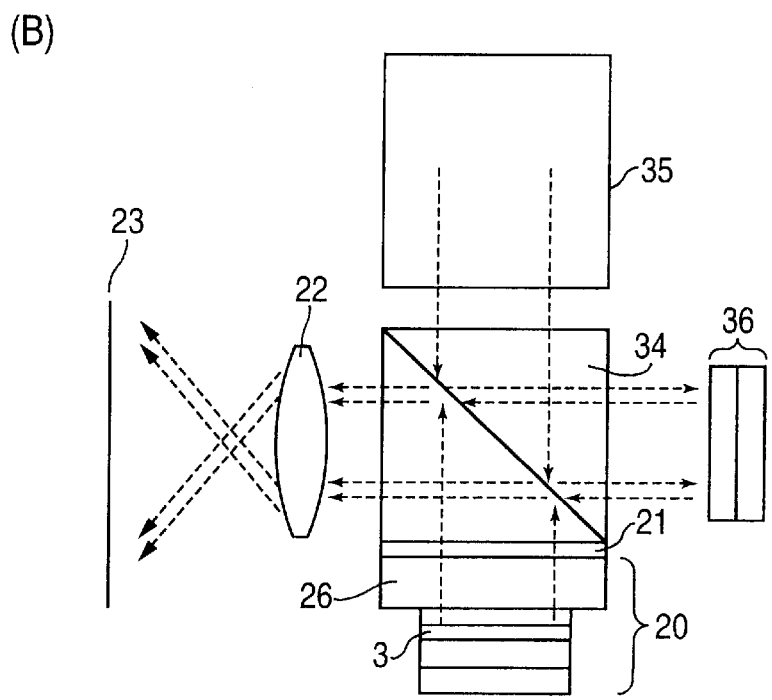

As a countermeasure, an exemplary variation thereof is shown in FIGS. 25 (A) and 25(B), wherein the problem of the long optical path is effectively eliminated.

FIG. 25 (A) is a schematic side view of a variation of the color display apparatus shown in FIGS. 24 (A) and 24(B).

FIG. 25 (B) is a schematic back view of FIG. 25(A).

As shown in FIG. 25(A), the S-polarized components separated by the first polarization beam splitter 33 are transformed into the P-polarized components by a ½ wave plate 41.

On a top surface of the flat glass plate 26, a transmissive polarization hologram 42 for mainly diffracting the S-polarized components at an angle of 75° is closely provided. Therefore, the P-polarized components transformed by ½ wave plate 41 and impinging on the transmissive polarization hologram 42 directly pass through the transmissive polarization hologram 42.

On the other hand, on a bottom of the flat glass plate 26 opposing to the transmissive polarization hologram 42, a ¼ wave plate 43 and a mirror 44 being laminated together are closely provided. Thus, the P-polarized components passing through the transmissive polarization hologram 42 and the flat glass plate 26 are transformed into the S-polarized components on their paths through the ¼ wave plate 43 by being reflected by the mirror 44.

Accordingly, when the S-polarized components transformed impinge again on the transmissive polarization hologram 42 upward through the flat glass plate 26, they are diffracted at the angle of 75° this time, by the transmissive polarization hologram 42, and directly impinge on the color filter 3 through the flat glass plate 26.

As a result, as will be understood from FIG. 25 (A), the distance between the transmissive polarization hologram 42 and the color filter 3 is greatly reduced, resulting in an irradiation of a high efficiency on the color filter 3.

Figure 26A:
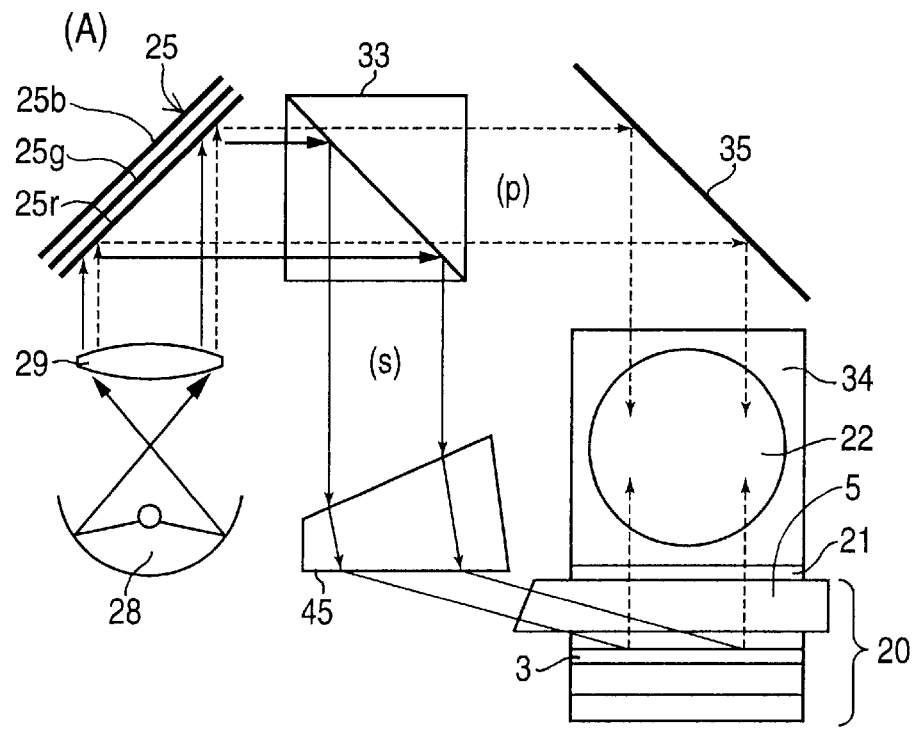
FIG. 26 (A) is a schematic side view of another variation of the color display apparatus shown in FIGS. 24 (A) and 24(B)
Figure 26B:
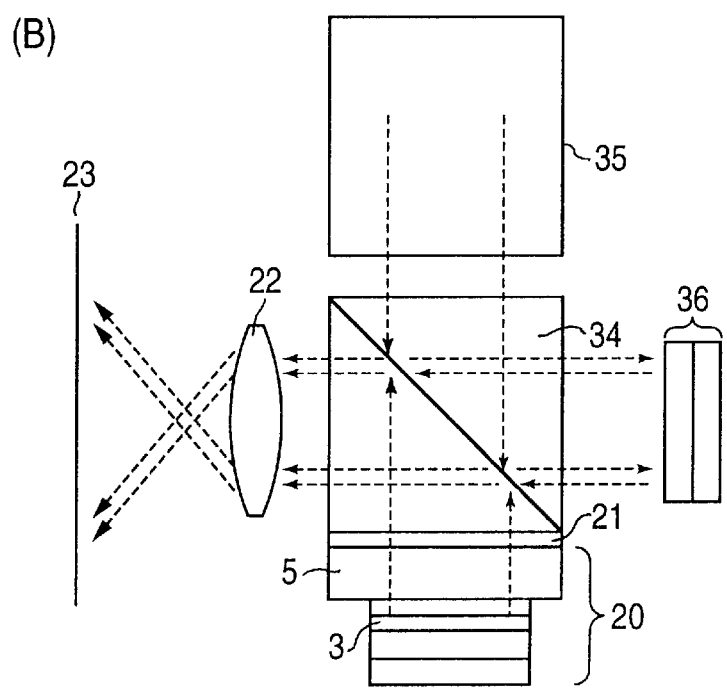
Figure 27:
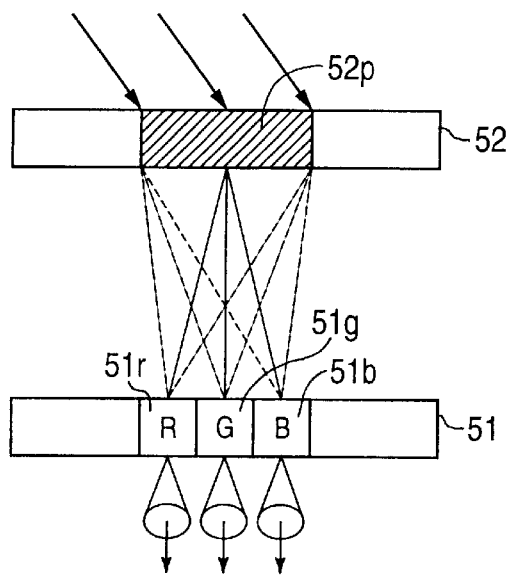
FIG. 27 is a partial schematic side view for explaining operations of a spatial light modulation section in the prior art.
Figure 28:
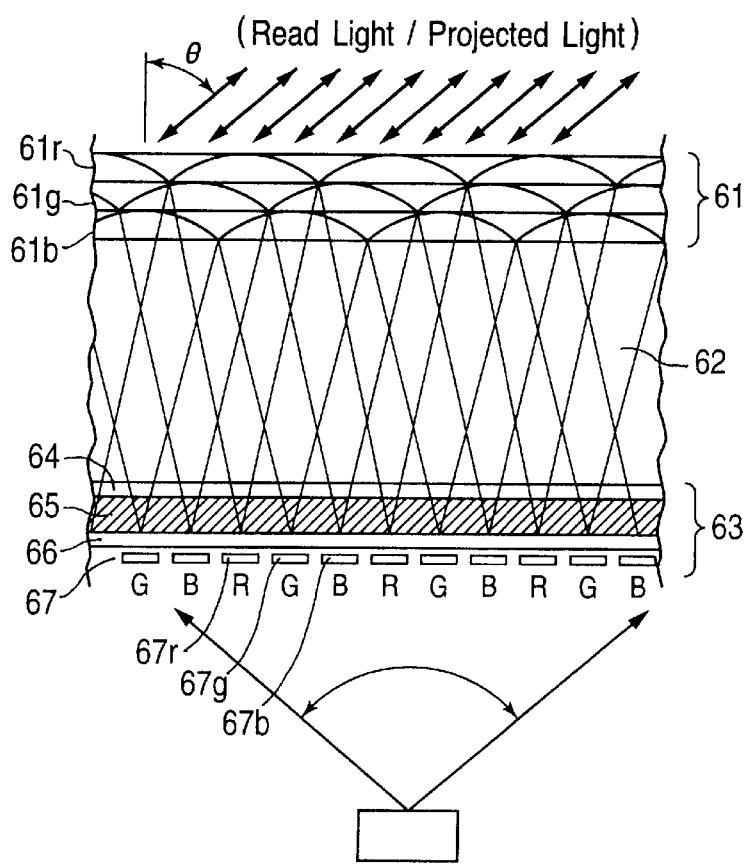
FIG. 28 is a partial schematic side view for explaining a function of a spatial light modulation section in the prior art.
Figure 29:
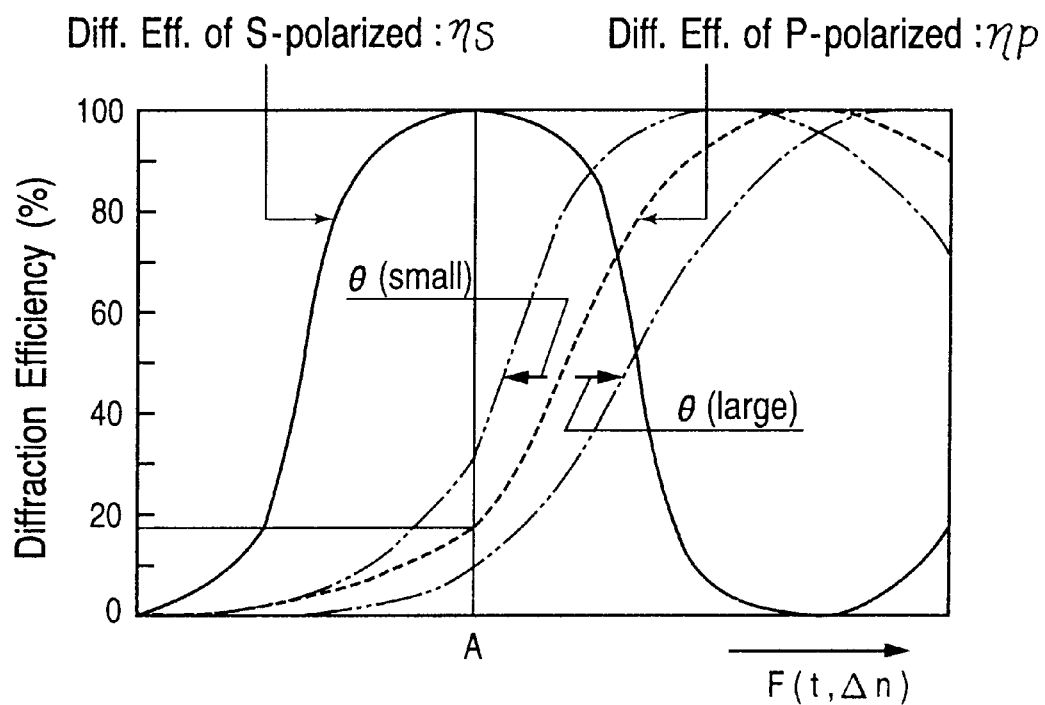
FIG. 29 is a graph showing a diffraction efficiency "$\eta p$" of the P-polarized component and a diffraction efficiency "$\eta s$" of the S-polarized component with respect to changes represented by a function F ($\Delta n$, t).

As another countermeasure, another exemplary variation thereof is shown in FIGS. 26 (A) and 26 (B), wherein the problem of the long optical path is also effectively eliminated.

FIG. 26 (A) is a schematic side view of another variation of the color display apparatus shown in FIGS. 24 (A) and 24(B).

FIG. 26 (B) is a schematic back view of FIG. 26(A).

In this embodiment, a part of the embodiment 6 is applied thereto.

As shown in FIG. 26(A), the S-polarized components separated by the first polarization beam splitter 33 impinge on a deflection prism 45. Thereby, the S-polarized components are refracted two times, and the refracted S-polarized components impinge on the incident surface of the coupling prism 5 of the spatial light modulation section 20 at a required angle as a narrow light beam.

Thus, the optical distance in the optical path to the color filter 3 can be reduced as well as the exemplary variation mentioned in the foregoing, and can be made uniform with respect to any position of the color filter 3, resulting in a reproduced color image without the shading as mentioned in the foregoing.

In this embodiment, it is preferable that the read light as the incident light has a narrow width to impinge on the color filter 3 of the spatial light modulation section 20. Actually, it is difficult to obtain such a read light having a narrow width in parallel for allowing to irradiate a small area of the color filter 3 because the light source has a certain size, not a point light source.

In particular, it is true when the light beam from the light source 28 is polarizingly separated into the P, S-polarized components, and the former is inputted to a larger area and the latter is inputted to a small area, resulting in a problem of incoordination when the modulated P, S-polarized components are synthesized as a single projected light.

However, it is possible to eliminate the above problem as follows.

A hologram plate having a polarization function without a lens function is provided in the spatial light modulation section 36. After producing two different polarized components having an identical section by using a polarization beam splitter, they are directly and separately inputted to the spatial light modulation sections 20, 36. Thus, it is possible to give a read light having a high uniformity and coordination to each of the spatial light modulation sections 20, 36.

What is claimed is:

1. A color filter provided with hologram means for spectrally diffracting an incident light into a plurality of light beams of different wavelength regions, and selectively converging the plurality of light beams on respective plurality of picture element electrodes corresponding to the different wavelength regions, wherein the hologram means has such characteristics that S-polarized components of the incident light are diffracted at approximately maximum diffraction efficiency at a predetermined incident angle of the incident light, and P-polarized components of the incident light are diffracted such that a difference between the maximum diffraction efficiency of the first polarized components and the diffraction efficiency of the second polarized components is not less than 30%, and diffracted S-polarized components are formed as the plurality of lights to be converged on the plurality of picture element electrodes corresponding to the different wavelength regions wherein polarization directions of the S-polarized component and the P-polarized components are orthogonal to each other.

2. A color filter as claimed in claim 1, wherein the predetermined angle is 60°.

3. A color filter as claimed in claim 1, wherein the hologram means has a laminated structure of wavelength dependent holographic lens array layers for respective color and the holographic lens array layers are individually provided.

4. A color filter as claimed in claim 1, wherein the hologram means has a laminated structure of wavelength dependent holographic lens array layers for respective color and the holographic lens array layers are produced on a single hologram member.

5. A color image display apparatus for projecting a composite color light beams on a screen as a color image comprising:

a light source for generating a read light;

a spatial light modulation section including a color filter having at least hologram means, a light modulation layer and a light reflecting layer having a layer of a plurality of picture element electrodes, wherein the hologram means having such characteristics that S-polarized components of the incident light are diffracted at approximately maximum diffraction efficiency at a predetermined incident angle of the incident light, and P-polarized components of the incident light are diffracted such that a difference between the maximum diffraction efficiency of the S-polarized components and the diffraction efficiency of the P-polarized components is not less than 30%, and diffracted S-polarized components are formed as the plurality of lights to be converged on the plurality of picture element electrodes corresponding to the different wavelength regions wherein polarization directions of the S-polarized component and the P-polarized components are orthogonal to each other;

an incident optical system for allowing the read light to impinge on the spatial light modulation section; and a projection optical system for projecting the read light modulated by the spatial light modulation section on a screen, wherein the color filter spectrally diffracts the S-polarized components of the read light impinging thereon into a plurality of light beams of different wavelength regions, and selectively converges the plurality of light beams on the plurality of picture element electrodes corresponding to the different wavelength regions through the light modulation section, and diffracted S-polarized components of the read light reflected by the light reflecting layer impinge again on the color filter by being modulated in a polarization mode by the light modulation layer of the spatial light modulation section, and polarizingly modulated S-polarized components pass through the color filter and are projected by the projection optical system on the screen.

6. A color image display apparatus as claimed in claim 5, further comprising a coupling prism closely provided on the color filter, the coupling prism having an incident surface at one side thereof and an output surface at a bottom surface thereof for leading the read light to the color filter.

7. A color image display apparatus as claimed in claim 5, further comprising a light spectrum restriction means provided in the incident optical system for restricting a bandwidth of respective colors of a white light generated by the light source as the read light.

8. A color image display apparatus as claimed in claim 5, further comprising additional hologram means provided in the incident optical system for causing the read light to impinge on the color filter at a predetermined angle so as to make an optical distance from the light source and the color filter to be equal regardless of positions of the color filter.

9. A color image display apparatus as claimed in claim 5, further comprising a deflection prism provided in the incident optical system for spectrally deflecting the read light from the light source and for causing the read light to impinge on the color filter at a predetermined angle.

10. A color image display apparatus for projecting a composite color light beams on a screen as a color image comprising:

a light source for generating a read light;

a spatial light modulation section including a color filter at least having a holographic lens array layer having a plurality of holographic lenses, a light modulation layer and a reflecting layer, each of the holographic lenses having such characteristics that a first polarized components of the incident light are diffracted at approximately maximum diffraction efficiency at a predetermined incident angle of the incident light, and second polarized components of the incident light are diffracted such that a difference between the maximum diffraction efficiency of the first polarized components and the diffraction efficiency of the second polarized components is not less than 30%, and diffracted first polarized components are formed as a plurality of lights to be converged on the plurality of picture element electrodes corresponding to the different wavelength regions wherein polarization directions of the first polarized component and the second polarized components are orthogonal to each other, the plurality of holographic lens array layer having a predetermined color pattern in the holographic lens array layer, the plurality of picture element electrodes being disposed as an electrode layer and having a same predetermined color pattern as that of the plurality of holographic lenses, the holographic lens array layer and the electrode layer being disposed horizontally as such that the read light filtered to a specific color by a holographic lens for the specific color reaches a picture element electrode for the same specific color, wherein a center of the holographic lens for the specific color and a center of the picture element electrode for the same specific color are displaced horizontally at a predetermined distance to each other;

an incident optical system for allowing the read light to impinge on the spatial light modulation section; and a projection optical system for projecting the read light modulated by the spatial light modulation section on a screen, wherein the color filter spectrally diffracts the first polarized components of the read light impinging thereon into a plurality of light beams of different wavelength regions, and selectively converges the plurality of light beams on the plurality of picture element electrodes corresponding to the different wavelength regions through the light modulation section, and diffracted first polarized components of the read light reflected by the light reflecting layer impinge again on the color filter by being modulated in a polarization mode by the light modulation layer of the spatial light modulation section, and polarizingly modulated first polarized components pass through the color filter and are projected by the projection optical system on the screen.

11. A color image display apparatus as claimed in claim 10, wherein the predetermined distance is ¼ to ½ length of the holographic lens.

12. A color image display apparatus as claimed in claim 10, further comprising a coupling prism closely provided on the color filter, the coupling prism having an incident surface at one side thereof and an output surface at a bottom surface thereof for leading the read light to the color filter.

13. A color image display apparatus as claimed in claim 10, further comprising a light spectrum restriction means provided in the incident optical system for restricting a bandwidth of respective colors of a white light generated by the light source as the read light.

14. A color image display apparatus as claimed in claim 10, further comprising additional hologram means provided in the incident optical system for causing the read light to impinge on the color filter at a predetermined angle so as to make an optical distance from the light source and the color filter to be equal regardless of positions of the color filter.

15. A color image display apparatus as claimed in claim 10, further comprising a deflection prism provided in the incident optical system for spectrally deflecting the read light from the light source and allowing to the read light to impinge on the color filter at a predetermined angle.

16. A color image display apparatus for projecting a composite color light beams on a screen as a color image comprising:

a light source for generating a read light;

a polarized light separation means for separating the read light into first polarized components and second polarized components;

a first light modulation section;

a second light modulation section;

a first incident optical system for allowing the first polarized components to impinge on the first light modulation section for undergoing a color modulation thereby;

a second incident optical system for causing the second polarized components to impinge on the second light modulation section for undergoing an intensity modulation thereby; and a projection optical system for projecting on a screen, color modulated first polarized components by the first light modulation section, and intensity modulated second polarized components by the second light modulation section, the first light modulation section including a color filter comprising hologram means, a first light modulation layer and a first light reflecting layer having a layer of a plurality of first picture element electrodes, the hologram means having such characteristics that the first polarized components of the incident light are diffracted at an approximately a maximum diffraction efficiency at a predetermined incident angle of the incident light, and the second polarized components of the incident light are diffracted such that a difference between the maximum diffraction efficiency of the first polarized components and the diffraction efficiency of the second polarized components is not less than 30%, and diffracted first polarized components are formed as a plurality of lights to be converged on the plurality of picture element electrodes corresponding to the different wavelength regions wherein polarization directions of the first polarized component and the second polarized components are orthogonal to each other;

the second spatial light modulation section including a second light modulation layer operating in synchronization with the first spatial light modulation section and a second reflecting layer having a plurality of second picture element electrodes disposed corresponding to the plurality of first picture element electrodes, and means for synthesizing the color modulated first polarized components and the intensity modulated second polarized components together to be projected by the projection optical system, wherein the synthesizing means directs the color modulated first polarized components to the projection optical system, and directs the second polarized components to the second light modulation section, and allows to pass straight the intensity modulated second polarized components from the second light modulated section to the projection optical system to form a single beam of composite light.

17. A color image display apparatus as claimed in claim 16, wherein the synthesizing means is a polarization beam splitter and the projection optical system comprises a projection lens for projecting the composite light on the screen.

18. A color image display apparatus as claimed in claim 16, further comprising a light spectrum restriction means provided in the incident optical system for restricting a bandwidth of respective colors of a white light generated by the light source as the read light.

* * * * *